(12) United States Patent
Chen et al.

(10) Patent No.: US 10,908,776 B2
(45) Date of Patent: Feb. 2, 2021

(54) HUMAN-COMPUTER INTERACTION METHOD OF USER TERMINAL, APPARATUS, AND USER TERMINAL

(71) Applicant: HUAWEI TECHNOLOGIES CO., LTD., Guangdong (CN)

(72) Inventors: Jianjun Chen, Shenzhen (CN); Fredrik Rusek, Lund (SE); Hongjun Wang, Lund (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/764,182

(22) PCT Filed: Sep. 29, 2015

(86) PCT No.: PCT/CN2015/091141
§ 371 (c)(1),
(2) Date: Mar. 28, 2018

(87) PCT Pub. No.: WO2017/054144
PCT Pub. Date: Apr. 6, 2017

(65) Prior Publication Data
US 2018/0321797 A1 Nov. 8, 2018

(51) Int. Cl.
*G06F 17/00* (2019.01)
*G06F 3/0482* (2013.01)
(Continued)

(52) U.S. Cl.
CPC .......... *G06F 3/0482* (2013.01); *G06F 3/0488* (2013.01); *G06F 3/04842* (2013.01);
(Continued)

(58) Field of Classification Search
CPC .............................. G06F 3/0482; G06F 9/445
(Continued)

(56) References Cited

U.S. PATENT DOCUMENTS 9,063,563 B1* 6/2015 Gray ................... G06F 3/04842
9,536,126 B2* 1/2017 Yoon .................... G06F 3/0486
(Continued)

FOREIGN PATENT DOCUMENTS

CN 102752441 A 10/2012
CN 103927004 A 7/2014
(Continued)

OTHER PUBLICATIONS

International Search Report issued in International Application No. PCT/CN2015/091141 dated Jun. 30, 2016, 15 pages.
(Continued)

*Primary Examiner* — Stephen S Hong
*Assistant Examiner* — Matthew J Ludwig
(74) *Attorney, Agent, or Firm* — Fish & Richardson P.C.

(57) ABSTRACT

A fingerprint information is collected when a touch screen of a terminal device remains black. Fingerprint recognition is performed. In response to success of the fingerprint recognition, lighting up the touch screen and displaying a first interface. An icon of a first application and a first plurality of application options of the first application are displayed together on the first interface. The first plurality of application options of the first application are displayed in an area within a range of the icon.

20 Claims, 12 Drawing Sheets

(51) Int. Cl.
  *G06F 9/445* (2018.01)
  *G06F 21/32* (2013.01)
  *G06F 9/451* (2018.01)
  *G06F 3/0484* (2013.01)
  *G06F 3/0488* (2013.01)
  *G06K 9/00* (2006.01)

(52) U.S. Cl.
  CPC .............. *G06F 9/445* (2013.01); *G06F 9/451* (2018.02); *G06F 9/453* (2018.02); *G06F 21/32* (2013.01); *G06K 9/00087* (2013.01)

(58) Field of Classification Search
  USPC ........ 715/204, 702, 825, 863, 865, 203, 208
  See application file for complete search history.

(56) References Cited

U.S. PATENT DOCUMENTS

| | | | |
|---|---|---|---|
| 10,025,945 B2* | 7/2018 | Hsiao | G06F 21/6218 |
| 2014/0181962 A1 | 6/2014 | Seo et al. | |
| 2016/0165002 A1* | 6/2016 | LeBeau | H04L 67/306 709/204 |
| 2016/0301799 A1* | 10/2016 | Chen | G06F 3/0488 |
| 2016/0306524 A1* | 10/2016 | Park | H04M 1/236 |

FOREIGN PATENT DOCUMENTS

| | | |
|---|---|---|
| CN | 104331656 A | 2/2015 |
| CN | 104656963 A | 5/2015 |
| CN | 104794382 A | 7/2015 |
| CN | 104850433 A | 8/2015 |
| EP | 2360570 A2 | 8/2011 |
| EP | 2869176 A2 | 5/2015 |
| WO | 2013010155 A2 | 1/2013 |

OTHER PUBLICATIONS

Extended European Search Report issued in European Application No. 15905056.6 dated Oct. 12, 2018, 8 pages.

* cited by examiner

HUMAN-COMPUTER INTERACTION METHOD OF USER TERMINAL, APPARATUS, AND USER TERMINAL

CROSS-REFERENCE TO RELATED APPLICATIONS

This application is a national stage of International Application No. PCT/CN2015/091141, filed on Sep. 29, 2015, which is hereby incorporated by reference in its entirety.

TECHNICAL FIELD

The present invention relates to the field of communications technologies, and in particular, to a human-computer interaction method of a user terminal, an apparatus, and a user terminal.

BACKGROUND

Currently, featuring high intelligence and great convenience, user terminals such as smartphones and iPads have become necessary social communication tools carried by users anytime. When a user needs to contact a buddy by using a screen-off user terminal, a popular practice is that after a screen is lighted up by using a fingerprint, a social application is started to search for a buddy option that needs to be contacted, and then, the buddy option is tapped to enter an application interface corresponding to the buddy option, so as to chat.

However, it is discovered from practice that a user frequently contacts only several buddy options. Therefore, searching for a buddy option by the user in the foregoing manner is relatively complex and time-consuming.

SUMMARY

Embodiments of the present invention disclose a human-computer interaction method of a user terminal, an apparatus, and a user terminal, so as to improve application option search efficiency.

A first aspect of the embodiments of the present invention discloses a human-computer interaction method of a user terminal, including:

collecting entered fingerprint information;

if target fingerprint information that matches the fingerprint information exists in stored preset fingerprint information, determining an application bound to the target fingerprint information; and displaying at least one application option included in the application.

With reference to the first aspect of the embodiments of the present invention, in a first possible implementation manner of the first aspect of the embodiments of the present invention, after the displaying at least one application option included in the application, the method further includes:

obtaining a slide instruction for sliding in a preset direction by using an input position of the fingerprint information as a start position, where the slide instruction includes the preset direction, the preset direction is used to indicate a target application option, and the target application option is any one of the at least one application option displayed on the user terminal; and displaying, in response to the slide instruction, an interface corresponding to the target application option.

With reference to the first aspect of the embodiments of the present invention, in a second possible implementation manner of the first aspect of the embodiments of the present invention, the displaying at least one application option included in the application includes: displaying at least two application options included in the application; and the method further includes:

obtaining a slide instruction of a user for sliding on a touchscreen or a fingerprint sensor, where the slide instruction includes a slide direction;

determining, according to a mapping relationship between a start position of the sliding and a central position of the at least two application options, by using the central position as a reference, and according to the slide direction, a first application option in the at least two application options displayed on the user terminal; and displaying an interface corresponding to the first application option.

With reference to the first aspect of the embodiments of the present invention or the first possible implementation manner of the first aspect of the embodiments of the present invention, in a third possible implementation manner of the first aspect of the embodiments of the present invention, the displaying at least one application option included in the application includes:

displaying a floating window on a fingerprint information input interface; displaying, on the floating window, an interface on which an application icon of the application is located; displaying the application icon of the application in a central area of the interface, and hiding an icon other than the application icon of the application in multiple application icons included in the interface; and displaying, around the application icon of the application, the at least one application option included in the application; or displaying an interface on which an application icon of the application is located; displaying a floating window on the interface, and displaying, on the floating window, multiple application icons included in the interface; and displaying, in a surrounding area of the application icon that is of the application and that is displayed on the floating window, the at least one application option included in the application, where the surrounding area is an area that falls within a preset range and that is centered on the application icon of the application.

With reference to the second possible implementation manner of the first aspect of the embodiments of the present invention, in a fourth possible implementation manner of the first aspect of the embodiments of the present invention, the displaying at least two application options included in the application includes:

displaying a floating window on a fingerprint information input interface; displaying, on the floating window, an interface on which an application icon of the application is located; displaying the application icon of the application in a central area of the interface, and hiding an icon other than the application icon of the application in multiple application icons included in the interface; and displaying, around the application icon of the application, the at least two application options included in the application; or displaying an interface on which an application icon of the application is located; displaying a floating window on the interface, and displaying, on the floating window, multiple application icons included in the interface; and displaying, in a surrounding area of the application icon that is of the application and that is displayed on the floating window, the at least two application options included in the application, where the surrounding area is an area that falls within a preset range and that is centered on the application icon of the application.

With reference to the first aspect of the embodiments of the present invention or the first possible implementation manner of the first aspect of the embodiments of the present invention, in a fifth possible implementation manner of the first aspect of the embodiments of the present invention, the displaying at least one application option included in the application includes:

obtaining current environment information;

if the current environment information matches historical environment information obtained when the application is previously started, obtaining, from application options included in the application, at least one application option according to historical usage records of the application options; and displaying the at least one application option.

With reference to the second possible implementation manner of the first aspect of the embodiments of the present invention, in a sixth possible implementation manner of the first aspect of the embodiments of the present invention, the displaying at least two application options included in the application includes:

obtaining current environment information;

if the current environment information matches historical environment information obtained when the application is previously started, obtaining, from application options included in the application, at least two application options according to historical usage records of the application options; and displaying the at least two application options.

With reference to the fifth possible implementation manner of the first aspect of the embodiments of the present invention, in a seventh possible implementation manner of the first aspect of the embodiments of the present invention, the obtaining, from application options included in the application, at least one application option according to historical usage records of the application options includes:

obtaining use frequencies of multiple application options according to the historical usage records of the application options included in the application; and obtaining a preset quantity of application options in descending order of the use frequencies, and determining the preset quantity of application options as at least one application option; or obtaining use frequencies of multiple application options according to the historical usage records of the application options included in the application; and if a use frequency of the application option exceeds a preset use frequency threshold, determining the application option as at least one application option; or obtaining use frequencies of multiple application options according to the historical usage records of the application options included in the application; sorting, in descending order of the use frequencies, the application options included in the application; determining a quantity of at least one application option according to a specified preset quantity ratio of the application options included in the application to the at least one application option; and obtaining the quantity of at least one application option from sorted application options in the descending order of the use frequencies.

With reference to the sixth possible implementation manner of the first aspect of the embodiments of the present invention, in an eighth possible implementation manner of the first aspect of the embodiments of the present invention, the obtaining, from application options included in the application, at least two application options according to historical usage records of the application options includes:

obtaining use frequencies of multiple application options according to the historical usage records of the application options included in the application; and obtaining a preset quantity of application options in descending order of the use frequencies, and determining the preset quantity of application options as at least two application options; or obtaining use frequencies of multiple application options according to the historical usage records of the application options included in the application; and if a use frequency of the application option exceeds a preset use frequency threshold, determining the application option as at least two application options; or obtaining use frequencies of multiple application options according to the historical usage records of the application options included in the application; sorting, in descending order of the use frequencies, the application options included in the application; determining a quantity of at least two application options according to a specified preset quantity ratio of the application options included in the application to the at least two application options; and obtaining the quantity of at least two application options from sorted application options in the descending order of the use frequencies.

With reference to any one of the fifth possible implementation manner of the first aspect of the embodiments of the present invention to the eighth possible implementation manner of the first aspect of the embodiments of the present invention, in a ninth possible implementation manner of the first aspect of the embodiments of the present invention, a manner in which the current environment information matches the historical environment information obtained when the application is previously started specifically includes at least one of the following:

a current time included in the current environment information matches a historical enabling start time included in the historical environment information obtained when the application is previously started;

a current position at which the user terminal is located and that is included in the current environment information matches a historical position at which the user terminal is located and that is included in the historical environment information obtained when the application is previously started; or current weather information included in the current environment information matches historical weather information of the user terminal that is included in the historical environment information obtained when the application is previously started.

With reference to the first aspect of the embodiments of the present invention, in a tenth possible implementation manner of the first aspect of the embodiments of the present invention, after the determining an application bound to the target fingerprint information, the method further includes:

if a one-hand operation mode on the user terminal is started, identifying, in the one-hand operation mode, a manner of holding the user terminal by a user with one hand, where the holding manner includes left-hand holding or right-hand holding; and querying, according to a prestored correspondence between a holding manner and a touch area, a target touch area corresponding to the identified holding manner; and the displaying at least one application option included in the application includes:

displaying an application icon of the application in the target touch area, and displaying, in a surrounding area of the application icon of the application, the at least one application option included in the application, where the target touch area includes the surrounding area.

With reference to the first aspect of the embodiments of the present invention, in an eleventh possible implementation manner of the first aspect of the embodiments of the present invention, after the determining an application bound to the target fingerprint information, the method further includes:

obtaining overall evaluation information of application options included in the application, where the overall evaluation information of the application options includes overall evaluation indexes; and if an overall evaluation index included in overall evaluation information of the application option exceeds a preset evaluation index threshold, determining the application option as a target application option; and the displaying at least one application option included in the application includes:

displaying the target application option.

With reference to any one of the fifth possible implementation manner of the first aspect of the embodiments of the present invention to the ninth possible implementation manner of the first aspect of the embodiments of the present invention, in a twelfth possible implementation manner of the first aspect of the embodiments of the present invention, the method further includes:

if the current environment information does not match the historical environment information obtained when the application is previously started, obtaining overall evaluation information of the application options included in the application, where the overall evaluation information of the application options includes overall evaluation indexes;

if an overall evaluation index included in overall evaluation information of the application option exceeds a preset evaluation index threshold, determining the application option as a target application option; and displaying the target application option.

With reference to the first aspect of the embodiments of the present invention and the third possible implementation manner of the first aspect of the embodiments of the present invention to the tenth possible implementation manner of the first aspect of the embodiments of the present invention, in a thirteenth possible implementation manner of the first aspect of the embodiments of the present invention, the method further includes:

receiving a touch instruction for a target application option in the displayed application option; and displaying, in response to the touch instruction, an interface corresponding to the target application option.

A second aspect of the embodiments of the present invention discloses a human-computer interaction apparatus, including:

a collecting unit, configured to collect entered fingerprint information;

a determining unit, configured to: if target fingerprint information that matches the fingerprint information exists in stored preset fingerprint information, determine an application bound to the target fingerprint information; and a first display unit, configured to display at least one application option included in the application.

With reference to the second aspect of the embodiments of the present invention, in a first possible implementation manner of the second aspect of the embodiments of the present invention, the user terminal further includes:

a first obtaining unit, configured to: after the first display unit displays the at least one application option included in the application, obtain a slide instruction for sliding in a preset direction by using an input position of the fingerprint information as a start position, where the slide instruction includes the preset direction, the preset direction is used to indicate a target application option, and the target application option is any one of the at least one application option displayed on the user terminal; and a second display unit, configured to display, in response to the slide instruction, an interface corresponding to the target application option.

With reference to the second aspect of the embodiments of the present invention, in a second possible implementation manner of the second aspect of the embodiments of the present invention, a manner in which the first display unit displays the at least one application option included in the application is specifically: displaying at least two application options included in the application; and the user terminal further includes:

a second obtaining unit, configured to obtain a slide instruction of a user for sliding on a touchscreen or a fingerprint sensor, where the slide instruction includes a slide direction; where the determining unit is further configured to determine, according to a mapping relationship between a start position of the sliding and a central position of the at least two application options, by using the central position as a reference, and according to the slide direction, a first application option in the at least two application options displayed on the user terminal; and a third display unit, configured to display an interface corresponding to the first application option.

With reference to the second aspect of the embodiments of the present invention or the first possible implementation manner of the second aspect of the embodiments of the present invention, in a third possible implementation manner of the second aspect of the embodiments of the present invention, a manner in which the first display unit displays the at least one application option included in the application is specifically:

displaying a floating window on a fingerprint information input interface; displaying, on the floating window, an interface on which an application icon of the application is located; displaying the application icon of the application in a central area of the interface, and hiding an icon other than the application icon of the application in multiple application icons included in the interface; and displaying, around the application icon of the application, the at least one application option included in the application; or displaying an interface on which an application icon of the application is located; displaying a floating window on the interface, and displaying, on the floating window, multiple application icons included in the interface; and displaying, in a surrounding area of the application icon that is of the application and that is displayed on the floating window, the at least one application option included in the application, where the surrounding area is an area that falls within a preset range and that is centered on the application icon of the application.

With reference to the second possible implementation manner of the second aspect of the embodiments of the present invention, in a fourth possible implementation manner of the second aspect of the embodiments of the present invention, a manner in which the first display unit displays the at least two application options included in the application is specifically:

displaying a floating window on a fingerprint information input interface; displaying, on the floating window, an interface on which an application icon of the application is located; displaying the application icon of the application in a central area of the interface, and hiding an icon other than the application icon of the application in multiple application icons included in the interface; and displaying, around the application icon of the application, the at least two application options included in the application; or displaying an interface on which an application icon of the application is located; displaying a floating window on the interface, and displaying, on the floating window, multiple application icons included in the interface; and displaying, in a surrounding area of the application icon that is of the application and that is displayed on the floating window, the at least two application options included in the application, where the surrounding area is an area that falls within a preset range and that is centered on the application icon of the application.

With reference to the second aspect of the embodiments of the present invention or the first possible implementation manner of the second aspect of the embodiments of the present invention, in a fifth possible implementation manner of the second aspect of the embodiments of the present invention, the first display unit includes:

a first obtaining subunit, configured to obtain current environment information;

a second obtaining subunit, configured to: if the current environment information matches historical environment information obtained when the application is previously started, obtain, from application options included in the application, at least one application option according to historical usage records of the application options; and a first display subunit, configured to display the at least one application option.

With reference to the second possible implementation manner of the second aspect of the embodiments of the present invention, in a sixth possible implementation manner of the second aspect of the embodiments of the present invention, the first display unit includes:

a third obtaining subunit, configured to obtain current environment information;

a fourth obtaining subunit, configured to: if the current environment information matches historical environment information obtained when the application is previously started, obtain, from application options included in the application, at least two application options according to historical usage records of the application options; and a second display subunit, configured to display the at least two application options.

With reference to the fifth possible implementation manner of the second aspect of the embodiments of the present invention, in a seventh possible implementation manner of the second aspect of the embodiments of the present invention, a manner in which the second obtaining subunit obtains, from the application options included in the application, the at least one application option according to the historical usage records of the application options is specifically:

obtaining use frequencies of multiple application options according to the historical usage records of the application options included in the application; and obtaining a preset quantity of application options in descending order of the use frequencies, and determining the preset quantity of application options as at least one application option; or obtaining use frequencies of multiple application options according to the historical usage records of the application options included in the application; and if a use frequency of the application option exceeds a preset use frequency threshold, determining the application option as at least one application option; or obtaining use frequencies of multiple application options according to the historical usage records of the application options included in the application; sorting, in descending order of the use frequencies, the application options included in the application; determining a quantity of at least one application option according to a specified preset quantity ratio of the application options included in the application to the at least one application option; and obtaining the quantity of at least one application option from sorted application options in the descending order of the use frequencies.

With reference to the sixth possible implementation manner of the second aspect of the embodiments of the present invention, in an eighth possible implementation manner of the second aspect of the embodiments of the present invention, a manner in which the fourth obtaining subunit obtains, from the application options included in the application, the at least two application options according to the historical usage records of the application options is specifically:

obtaining use frequencies of multiple application options according to the historical usage records of the application options included in the application; and obtaining a preset quantity of application options in descending order of the use frequencies, and determining the preset quantity of application options as at least two application options; or obtaining use frequencies of multiple application options according to the historical usage records of the application options included in the application; and if a use frequency of the application option exceeds a preset use frequency threshold, determining the application option as at least two application options; or obtaining use frequencies of multiple application options according to the historical usage records of the application options included in the application; sorting, in descending order of the use frequencies, the application options included in the application; determining a quantity of at least two application options according to a specified preset quantity ratio of the application options included in the application to the at least two application options; and obtaining the quantity of at least two application options from sorted application options in the descending order of the use frequencies.

With reference to any one of the fifth possible implementation manner of the second aspect of the embodiments of the present invention to the eighth possible implementation manner of the second aspect of the embodiments of the present invention, in a ninth possible implementation manner of the second aspect of the embodiments of the present invention, a manner in which the current environment information matches the historical environment information obtained when the application is previously started specifically includes at least one of the following:

a current time included in the current environment information matches a historical enabling start time included in the historical environment information obtained when the application is previously started;

a current position at which the user terminal is located and that is included in the current environment information matches a historical position at which the user terminal is located and that is included in the historical environment information obtained when the application is previously started; or current weather information included in the current environment information matches historical weather information of the user terminal that is included in the historical environment information obtained when the application is previously started.

With reference to the second aspect of the embodiments of the present invention, in a tenth possible implementation manner of the second aspect of the embodiments of the present invention, the user terminal further includes:

an identification unit, configured to: after the determining unit determines the application bound to the target fingerprint information, if a one-hand operation mode on the user terminal is started, identify, in the one-hand operation mode, a manner of holding the user terminal by a user with one hand, where the holding manner includes left-hand holding or right-hand holding; and a query unit, configured to query, according to a prestored correspondence between a holding manner and a touch area, a target touch area corresponding to the identified holding manner; where the first display unit is specifically configured to: display an application icon of the application in the target touch area, and display, in a surrounding area of the application icon of the application, the at least one application option included in the application, where the target touch area includes the surrounding area.

With reference to the second aspect of the embodiments of the present invention, in an eleventh possible implementation manner of the second aspect of the embodiments of the present invention, the user terminal further includes:

a third obtaining unit, configured to: after the determining unit determines the application bound to the target fingerprint information, obtain overall evaluation information of application options included in the application, where the overall evaluation information of the application options includes overall evaluation indexes; where the determining unit is further configured to: if an overall evaluation index included in overall evaluation information of the application option exceeds a preset evaluation index threshold, determine the application option as a target application option; and the first display unit is specifically configured to display the target application option.

With reference to any one of the fifth possible implementation manner of the second aspect of the embodiments of the present invention to the ninth possible implementation manner of the second aspect of the embodiments of the present invention, in a twelfth possible implementation manner of the second aspect of the embodiments of the present invention, the first display unit further includes:

a fifth obtaining subunit, configured to: if the current environment information does not match the historical environment information obtained when the application is previously started, obtain overall evaluation information of the application options included in the application, where the overall evaluation information of the application options includes overall evaluation indexes;

a determining subunit, configured to: if an overall evaluation index included in overall evaluation information of the application option exceeds a preset evaluation index threshold, determine the application option as a target application option; and a third display subunit, configured to display the target application option.

With reference to the second aspect of the embodiments of the present invention and the third possible implementation manner of the second aspect of the embodiments of the present invention to the tenth possible implementation manner of the second aspect of the embodiments of the present invention, in a thirteenth possible implementation manner of the second aspect of the embodiments of the present invention, the user terminal further includes:

a receiving unit, configured to receive a touch instruction for a target application option in the displayed application option; where the first display unit is further configured to display, in response to the touch instruction, an interface corresponding to the target application option.

A third aspect of the embodiments of the present invention discloses a user terminal, including a processor, an input apparatus, an output apparatus, and a memory, where the processor, the input apparatus, the output apparatus, and the memory are separately connected to a communications bus; where the input apparatus is configured to collect entered fingerprint information;

the processor is configured to: if target fingerprint information that matches the fingerprint information exists in stored preset fingerprint information, determine an application bound to the target fingerprint information; and the output apparatus is configured to display at least one application option included in the application.

With reference to the third aspect of the embodiments of the present invention, in a first possible implementation manner of the third aspect of the embodiments of the present invention, the input apparatus is further configured to: after the output apparatus displays the at least one application option included in the application, obtain a slide instruction for sliding in a preset direction by using an input position of the fingerprint information as a start position, where the slide instruction includes the preset direction, the preset direction is used to indicate a target application option, and the target application option is any one of the at least one application option displayed on the user terminal; and the output apparatus is further configured to display, in response to the slide instruction, an interface corresponding to the target application option.

With reference to the third aspect of the embodiments of the present invention, in a second possible implementation manner of the third aspect of the embodiments of the present invention, a manner in which the output apparatus displays the at least one application option included in the application is specifically: displaying at least two application options included in the application;

the input apparatus is further configured to obtain a slide instruction of a user for sliding on a touchscreen or a fingerprint sensor, where the slide instruction includes a slide direction;

the processor is further configured to determine, according to a mapping relationship between a start position of the sliding and a central position of the at least two application options, by using the central position as a reference, and according to the slide direction, a first application option in the at least two application options displayed on the user terminal; and the output apparatus is further configured to display an interface corresponding to the first application option.

With reference to the third aspect of the embodiments of the present invention or the first possible implementation manner of the third aspect of the embodiments of the present invention, in a third possible implementation manner of the third aspect of the embodiments of the present invention, a manner in which the output apparatus displays the at least one application option included in the application is specifically:

displaying a floating window on a fingerprint information input interface; displaying, on the floating window, an interface on which an application icon of the application is located; displaying the application icon of the application in a central area of the interface, and hiding an icon other than the application icon of the application in multiple application icons included in the interface; and displaying, around the application icon of the application, the at least one application option included in the application; or displaying an interface on which an application icon of the application is located; displaying a floating window on the interface, and displaying, on the floating window, multiple application icons included in the interface; and displaying, in a surrounding area of the application icon that is of the application and that is displayed on the floating window, the at least one application option included in the application, where the surrounding area is an area that falls within a preset range and that is centered on the application icon of the application.

With reference to the second possible implementation manner of the third aspect of the embodiments of the present invention, in a fourth possible implementation manner of the third aspect of the embodiments of the present invention, a manner in which the output apparatus displays the at least two application options included in the application is specifically:

displaying a floating window on a fingerprint information input interface; displaying, on the floating window, an interface on which an application icon of the application is located; displaying the application icon of the application in a central area of the interface, and hiding an icon other than the application icon of the application in multiple application icons included in the interface; and displaying, around the application icon of the application, the at least two application options included in the application; or displaying an interface on which an application icon of the application is located; displaying a floating window on the interface, and displaying, on the floating window, multiple application icons included in the interface; and displaying, in a surrounding area of the application icon that is of the application and that is displayed on the floating window, the at least two application options included in the application, where the surrounding area is an area that falls within a preset range and that is centered on the application icon of the application.

With reference to the third aspect of the embodiments of the present invention or the first possible implementation manner of the third aspect of the embodiments of the present invention, in a fifth possible implementation manner of the third aspect of the embodiments of the present invention, the input apparatus is further configured to: before the output apparatus displays the at least one application option included in the application, obtain current environment information; and the processor is further configured to: if the current environment information matches historical environment information obtained when the application is previously started, obtain, from application options included in the application, at least one application option according to historical usage records of the application options.

With reference to the second possible implementation manner of the third aspect of the embodiments of the present invention, in a sixth possible implementation manner of the third aspect of the embodiments of the present invention, the input apparatus is further configured to: before the output apparatus displays the at least two application options included in the application, obtain current environment information; and the processor is further configured to: if the current environment information matches historical environment information obtained when the application is previously started, obtain, from application options included in the application, at least two application options according to historical usage records of the application options.

With reference to the fifth possible implementation manner of the third aspect of the embodiments of the present invention, in a seventh possible implementation manner of the third aspect of the embodiments of the present invention, a manner in which the processor obtains, from the application options included in the application, the at least one application option according to the historical usage records of the application options is specifically:

obtaining use frequencies of multiple application options according to the historical usage records of the application options included in the application; and obtaining a preset quantity of application options in descending order of the use frequencies, and determining the preset quantity of application options as at least one application option; or obtaining use frequencies of multiple application options according to the historical usage records of the application options included in the application; and if a use frequency of the application option exceeds a preset use frequency threshold, determining the application option as at least one application option; or obtaining use frequencies of multiple application options according to the historical usage records of the application options included in the application; sorting, in descending order of the use frequencies, the application options included in the application; determining a quantity of at least one application option according to a specified preset quantity ratio of the application options included in the application to the at least one application option; and obtaining the quantity of at least one application option from sorted application options in the descending order of the use frequencies.

With reference to the sixth possible implementation manner of the third aspect of the embodiments of the present invention, in an eighth possible implementation manner of the third aspect of the embodiments of the present invention, a manner in which the processor obtains, from the application options included in the application, the at least two application options according to the historical usage records of the application options is specifically:

obtaining use frequencies of multiple application options according to the historical usage records of the application options included in the application; and obtaining a preset quantity of application options in descending order of the use frequencies, and determining the preset quantity of application options as at least two application options; or obtaining use frequencies of multiple application options according to the historical usage records of the application options included in the application; and if a use frequency of the application option exceeds a preset use frequency threshold, determining the application option as at least two application options; or obtaining use frequencies of multiple application options according to the historical usage records of the application options included in the application; sorting, in descending order of the use frequencies, the application options included in the application; determining a quantity of at least two application options according to a specified preset quantity ratio of the application options included in the application to the at least two application options; and obtaining the quantity of at least two application options from sorted application options in the descending order of the use frequencies.

With reference to any one of the fifth possible implementation manner of the third aspect of the embodiments of the present invention to the eighth possible implementation manner of the third aspect of the embodiments of the present invention, in a ninth possible implementation manner of the third aspect of the embodiments of the present invention, a manner in which the processor determines that the current environment information matches the historical environment information obtained when the application is previously started specifically includes at least one of the following:

a current time included in the current environment information matches a historical enabling start time included in the historical environment information obtained when the application is previously started;

a current position at which the user terminal is located and that is included in the current environment information matches a historical position at which the user terminal is located and that is included in the historical environment information obtained when the application is previously started; or current weather information included in the current environment information matches historical weather information of the user terminal that is included in the historical environment information obtained when the application is previously started.

With reference to the third aspect of the embodiments of the present invention, in a tenth possible implementation manner of the third aspect of the embodiments of the present invention, the processor is further configured to: after determining the application bound to the target fingerprint information, if a one-hand operation mode on the user terminal is started, identify, in the one-hand operation mode, a manner of holding the user terminal by a user with one hand, where the holding manner includes left-hand holding or right-hand holding; and query, according to a prestored correspondence between a holding manner and a touch area, a target touch area corresponding to the identified holding manner; and a manner in which the output apparatus displays the at least one application option included in the application is specifically:

displaying an application icon of the application in the target touch area, and displaying, in a surrounding area of the application icon of the application, the at least one application option included in the application, where the target touch area includes the surrounding area.

With reference to the third aspect of the embodiments of the present invention, in an eleventh possible implementation manner of the third aspect of the embodiments of the present invention, the input apparatus is further configured to: after the processor determines the application bound to the target fingerprint information, obtain overall evaluation information of application options included in the application, where the overall evaluation information of the application options includes overall evaluation indexes;

the processor is further configured to: if an overall evaluation index included in overall evaluation information of the application option exceeds a preset evaluation index threshold, determine the application option as a target application option; and a manner in which the output apparatus displays the at least one application option included in the application is specifically:

displaying the target application option.

With reference to any one of the fifth possible implementation manner of the third aspect of the embodiments of the present invention to the ninth possible implementation manner of the third aspect of the embodiments of the present invention, in a twelfth possible implementation manner of the third aspect of the embodiments of the present invention, the input apparatus is further configured to: if the current environment information does not match the historical environment information obtained when the application is previously started, obtain overall evaluation information of the application options included in the application, where the overall evaluation information of the application options includes overall evaluation indexes;

the processor is further configured to: if an overall evaluation index included in overall evaluation information of the application option exceeds a preset evaluation index threshold, determine the application option as a target application option; and the output apparatus is further configured to display the target application option.

With reference to the third aspect of the embodiments of the present invention and the third possible implementation manner of the third aspect of the embodiments of the present invention to the tenth possible implementation manner of the third aspect of the embodiments of the present invention, in a thirteenth possible implementation manner of the third aspect of the embodiments of the present invention, the input apparatus is further configured to receive a touch instruction for a target application option in the displayed application option; and the output apparatus is further configured to display, in response to the touch instruction, an interface corresponding to the target application option.

In the embodiments of the present invention, a user terminal may collect entered fingerprint information. If target fingerprint information that matches the fingerprint information exists in stored preset fingerprint information, the user terminal may determine an application bound to the target fingerprint information. Further, the user terminal may display at least one application option included in the application. It may be learned that in the embodiments of the present invention, after a user enters the fingerprint information, the user does not need to tap an application, and search for an application option after an application interface is entered and an option in the application is displayed; instead, the application bound to the fingerprint information may be directly determined, and the application option included in the application may be displayed, so as to improve application option search efficiency.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

The embodiments of the present invention disclose a human-computer interaction method of a user terminal, an apparatus, and a user terminal, so as to improve application option search efficiency. The following separately provides detailed descriptions.

Figure 1:
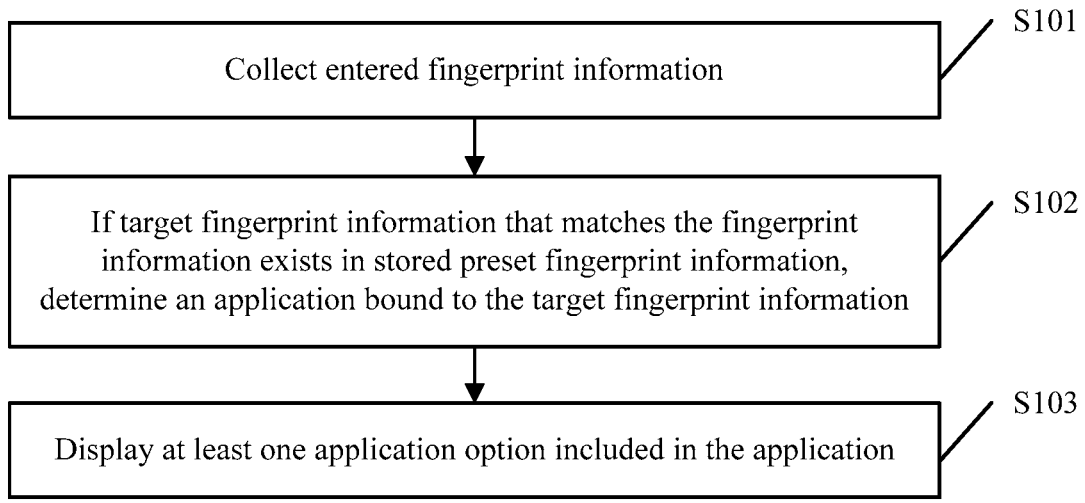
FIG. 1 is a schematic flowchart of a human-computer interaction method of a user terminal according to an embodiment of the present invention.

Referring to FIG. 1, FIG. 1 is a schematic flowchart of a human-computer interaction method of a user terminal according to an embodiment of the present invention. As shown in FIG. 1, the method may include the following steps.

S101. Collect entered fingerprint information.

In this embodiment of the present invention, the user terminal may collect the fingerprint information entered by a user in a fingerprint collecting area. The user terminal may be any electronic device that has a human-computer interaction interface. The user may communicate with a system by using the human-computer interaction interface and perform an operation. The user terminal may include but be not limited to various types of user terminals, for example, a smartphone, a notebook computer, a personal computer (Personal Computer, PC), a personal digital assistant (Personal Digital Assistant, PDA), a mobile Internet device (Mobile Internet Device, MID), and an intelligent wearable device (such as a smart watch or a smart band).

According to differently designed fingerprint sensors built in the user terminal, the fingerprint collecting area may be a part of a touchscreen of the user terminal, or may be a full-screen area of a touchscreen of the user terminal, or may be a fingerprint collecting area module that is disposed on a rear cover of the user terminal. This is not limited in this embodiment of the present invention. The fingerprint information may be minutiae information of a fingerprint of the user, for example, a start point and an end point of a fingerprint line, and a joint point and a bifurcation point of fingerprint lines.

In this embodiment of the present invention, if the user terminal is in a black screen state before step S101, the user may light up a screen in multiple manners. In a first manner, the user may light up the screen by pressing a physical power button of the user terminal. In a second manner, the user may enter fingerprint information on the touchscreen of the user terminal by using a specified finger. The fingerprint information of the specified finger is used to light up the screen.

S102. If target fingerprint information that matches the fingerprint information exists in stored preset fingerprint information, determine an application bound to the target fingerprint information.

In this embodiment of the present invention, the user terminal may collect multiple pieces of fingerprint information of the user in advance, and establish a binding relationship between fingerprint information and an application. One piece of fingerprint information may be bound to one application, or fingerprint string information may be bound to one application. This is not limited in this embodiment of the present invention. The application may be any application installed on the user terminal, for example, a social application, a game application, a music application, a picture application, or a group buying application. For example, index finger fingerprint information is bound to the social application, middle finger fingerprint information is bound to the game application, and fingerprint string information obtained by combining thumb fingerprint information and little finger fingerprint information is bound to the music application.

In this embodiment of the present invention, after the user terminal collects the fingerprint information entered by the user in the fingerprint collecting area, further, the user terminal may determine whether the target fingerprint information that matches the entered fingerprint information exists in the stored preset fingerprint information. If the target fingerprint information that matches the entered fingerprint information exists in the stored preset fingerprint information, the user terminal may query, in the pre-established binding relationship between fingerprint information and an application, an application corresponding to the target fingerprint information. In this way, the user terminal can determine the application bound to the fingerprint information entered by the user.

A specific implementation manner in which the user terminal determines whether the target fingerprint information that matches the entered fingerprint information exists in the stored preset fingerprint information may be as follows:

It is determined whether a degree of matching between the preset fingerprint information and the entered fingerprint information exceeds a preset matching degree threshold. If the degree of matching between the preset fingerprint information and the entered fingerprint information exceeds the preset matching degree threshold, the preset fingerprint information matches the entered fingerprint information, the preset fingerprint information may be used as the target fingerprint information, and it is determined that the target fingerprint information that matches the entered fingerprint information exists in the stored preset fingerprint information. The preset matching degree threshold may be a threshold that is set by a system, or may be a user-defined threshold, for example, 80%.

In an optional implementation manner, when it is preset that one piece of fingerprint information is bound to one application, after it is determined that the target fingerprint information that matches the fingerprint information exists in the stored preset fingerprint information, the user terminal may further perform the following steps:

determining whether input duration of the fingerprint information exceeds preset duration, and determining whether a touch pressure value obtained when the fingerprint information is being entered falls within a preset pressure threshold range; and if the input duration of the fingerprint information exceeds the preset duration and the touch pressure value obtained when the fingerprint information is being entered falls within the preset pressure threshold range, performing the step of determining the application bound to the target fingerprint information. In this implementation manner, an unauthorized user can be effectively prevented from fingerprint information theft for a wanton operation performed on the user terminal.

In another optional implementation manner, when it is preset that fingerprint string information is bound to one application, after it is determined that the target fingerprint information that matches the entered fingerprint information exists in the stored preset fingerprint information, the user terminal may further perform the following steps:

determining whether entered fingerprint string information matches preset fingerprint string information, and determining whether a time difference between entering same fingerprint information is less than a preset value; and if the entered fingerprint string information matches the preset fingerprint string information and the time difference between entering same fingerprint information is less than the preset value, performing the step of determining the application bound to the target fingerprint information. In this implementation manner, an unauthorized user can be effectively prevented from fingerprint information theft for a wanton operation performed on the user terminal.

S103. Display at least one application option included in the application.

In this embodiment of the present invention, after determining the application bound to the target fingerprint information, the user terminal may display the at least one application option included in the application. "Application option" may be understood as an application element in an application or a process option related to a process of the application. "Include" may be understood as contain or have.

Accordingly, a specific implementation manner of displaying the at least one application option included in the application may be:

displaying at least one application element included in the application; or displaying at least one process option that is included in the application and that is related to a process of the application.

In this embodiment of the present invention, the user terminal may present the application option in a form of an application option identifier. The application option identifier may include but be not limited to information such as an image, a nickname, a character, a character string, and a number. For example, assuming that the application is a social application, a buddy image, a buddy nickname, or the like in the social application may be displayed. For another example, assuming that the application is an address book application, a contact name, a contact phone number, or the like in an address book may be displayed. For another example, assuming that the application is a game application, a process option (for example, start a next level, back, or select an item) that is related to a process when the user exits the game last time may be displayed. For another example, assuming that the application is a group buying application, a name of a shop or an image of a group buying product may be displayed. Group buying is available for the shop and the group buying product at a current date.

The displayed at least one application option may be arranged in any manner. For example, the at least one application option is presented in a honeycomb shape around an application icon, or is presented in a rectangular shape around an application icon, or is presented in a user-defined graphic shape around an application icon. This is not limited in this embodiment of the present invention.

In an optional implementation manner, a specific implementation manner in which the user terminal displays the at least one application option included in the application may be:

displaying a floating window on a fingerprint information input interface; displaying, on the floating window, an interface on which an application icon of the application is located; displaying the application icon of the application in a central area of the interface, and hiding an icon other than the application icon of the application in multiple application icons included in the interface; and displaying, around the application icon of the application, the at least one application option included in the application.

In this implementation manner, the user terminal may display the floating window on the fingerprint information input interface, hide, from the floating window, the icon other than the application icon of the application in the multiple application icons included in the interface on which the application icon of the application is located, and display only the at least one application option included in the application. In this way, a hierarchical graphic interface can be displayed to a user, so that a phenomenon in which the user is exposed to visual clutter because multiple application options are displayed on one interface is avoided. In addition, the user can easily search for an application icon of the application, and the user is prevented from performing a misoperation on an icon other than the application icon of the application, and performs a related operation only on the application icon.

Figure 2:
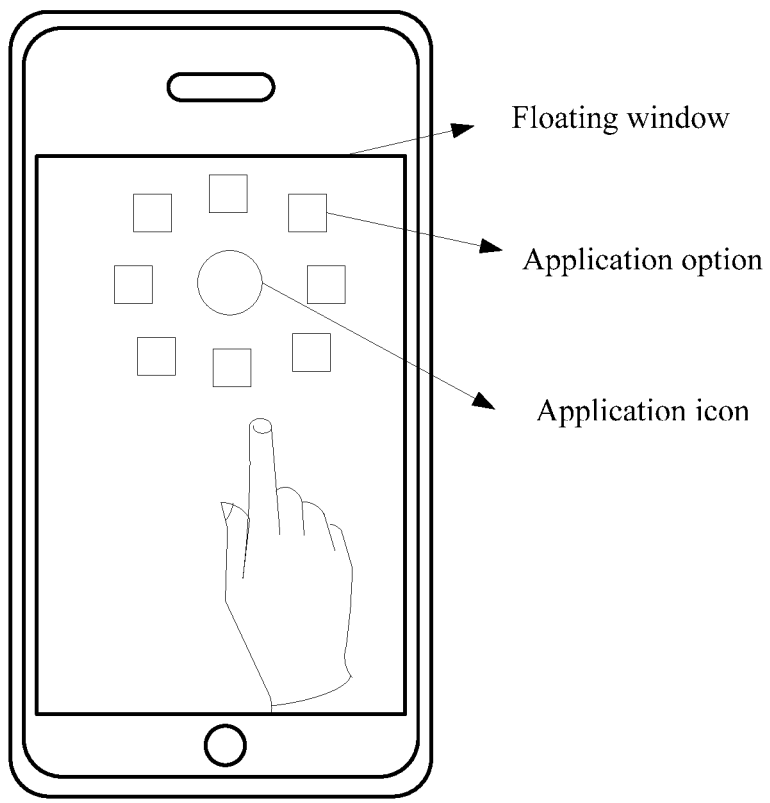
FIG. 2 is a schematic diagram of a human-computer interaction interface of a user terminal according to an embodiment of the present invention.

Referring to FIG. 2, FIG. 2 is a schematic diagram of a human-computer interaction interface of a user terminal according to an embodiment of the present invention. As shown in FIG. 2, when a finger of a user enters fingerprint information on the human-computer interaction interface (such as a touchscreen) of the user terminal, the user terminal displays a floating window on a fingerprint information input interface, displays, on the floating window, an interface on which an application icon of an application bound to the fingerprint information is located, also displays the application icon (such as a circular icon in the middle in FIG. 2) of the application in a central area of the interface, hides an icon other than the application icon of the application in at least one application icon included in the interface, and displays, around the application icon of the application, at least one application option (such as at least one quadrate application option around the circular icon in the middle in FIG. 2) included in the application.

In another optional implementation manner, a specific implementation manner in which the user terminal displays the at least one application option included in the application may be:

displaying an interface on which an application icon of the application is located; displaying a floating window on the interface, and displaying, on the floating window, multiple application icons included in the interface; and displaying, in a surrounding area of the application icon that is of the application and that is displayed on the floating window, the at least one application option included in the application. The surrounding area is an area that falls within a preset range and that is centered on the application icon of the application, and the area that falls within the preset range does not overlap an area occupied by another application icon.

In this embodiment, the user terminal displays the floating window on the interface on which the application icon of the application is located, also displays all application icons in the interface, and displays, in the surrounding area of the application icon of the application bound to fingerprint information, at least one application option included in the application. In this way, a hierarchical graphic interface can be displayed to a user, so that a phenomenon in which the user is exposed to visual clutter because multiple application options are displayed on one interface is avoided. In addition, the user can view all the application icons included in the interface, and the user can temporarily change an operation object as required.

Figure 3:
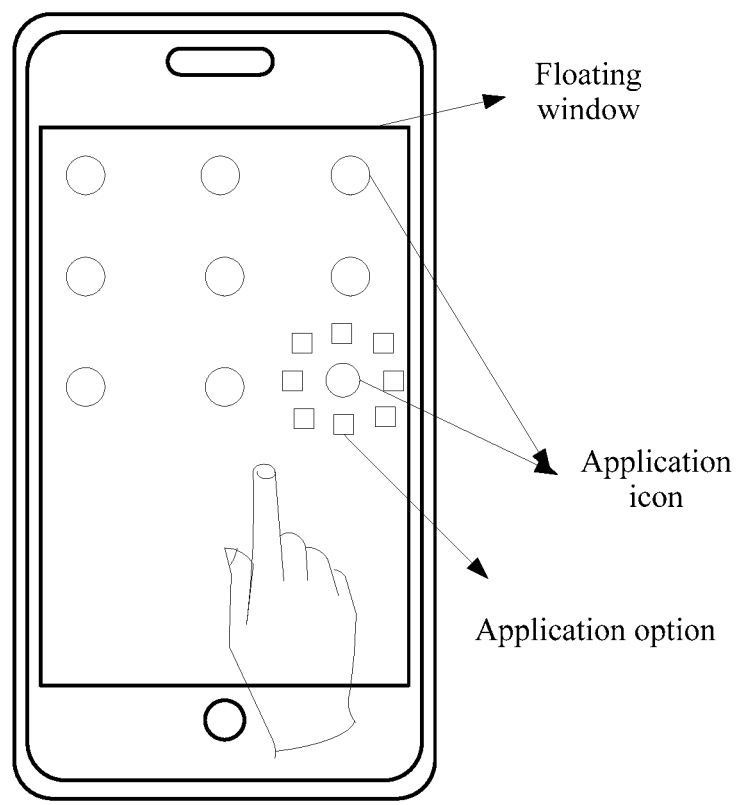
FIG. 3 is a schematic diagram of another human-computer interaction interface of a user terminal according to an embodiment of the present invention.

Referring to FIG. 3, FIG. 3 is a schematic diagram of another human-computer interaction interface of a user terminal according to an embodiment of the present invention. As shown in FIG. 3, when a finger of a user enters fingerprint information on the human-computer interaction interface (such as a touchscreen) of the user terminal, the user terminal displays an interface on which an application icon of an application bound to the fingerprint information is located; displays a floating window on the interface, and displays, on the floating window, multiple application icons (such as multiple circular icons shown in FIG. 3) included in the interface; and displays, in a surrounding area of the application icon that is of the application and that is displayed on the floating window, at least one application option (such as at least one quadrate application option that is shown in FIG. 3 and that is displayed in the surrounding area of the application icon of the application) included in the application.

It should be noted that manners, which are shown in FIG. 2 or FIG. 3, of presenting application options on a human-computer interaction interface of a user terminal are merely manners listed in the embodiments of the present invention. In other words, the embodiments of the present invention are not limited to the presentation manners shown in FIG. 2 or FIG. 3.

In another optional implementation manner, a specific implementation manner in which the user terminal displays the at least one application option included in the application may include the following steps.

(11) Obtain current environment information.

(12) If the current environment information matches historical environment information obtained when the application is previously started, obtain, from application options included in the application, at least one application option according to historical usage records of the application options.

(13) Display the at least one application option, and end this procedure.

(14) If the current environment information does not match the historical environment information obtained when the application is previously started, obtain overall evaluation information of the application options included in the application, where the overall evaluation information of the application options includes overall evaluation indexes.

(15) If an overall evaluation index included in overall evaluation information of an application option exceeds a preset evaluation index threshold, determine the application option as a target application option.

(16) Display the target application option.

In this implementation manner, with reference to the current environment information, the user terminal may select, from the at least one application option included in the application, some application options that match the current environment information, instead of selecting all application options. In this way, an individual demand of the user can be met, and user experience can be improved.

In another optional implementation manner, after step S102, the user terminal may further perform the following steps.

(21) If a one-hand operation mode on the user terminal is started, identify, in the one-hand operation mode, a manner of holding the user terminal by a user with one hand, where the holding manner includes left-hand holding or right-hand holding.

(22) Query, according to a prestored correspondence between a holding manner and a touch area, a target touch area corresponding to the identified holding manner.

A specific implementation manner of step S103 may be:

displaying an application icon of the application in the target touch area, and displaying, in a surrounding area of the application icon of the application, the at least one application option included in the application, where the target touch area includes the surrounding area.

Optionally, after step S103, the user terminal may further perform the following steps.

(31) Receive a touch instruction for a target application option in the displayed application option.

(32) Display, in response to the touch instruction, an interface corresponding to the target application option.

In this implementation manner, multiple pressure sensors may be disposed in the user terminal (on two sides or four sides of the user terminal), and a left-hand/right-hand holding manner of the user may be identified by using different pressure detected by the multiple pressure sensors. The user terminal may prestore the correspondence between a holding manner and a touch area. The correspondence may be obtained in advance by means of multiple tests. In the correspondence, a touch area corresponding to each holding manner is a touchscreen area that is of the user terminal and that can be touched by a finger of the user when the user holds the user terminal in the holding manner.

The user terminal determines the target touch area corresponding to the current holding manner of the user. After the application icon of the application is displayed in the target touch area, and the at least one application option included in the application is displayed in the surrounding area of the application icon of the application, the user may touch, in the target touch area in a tapping or sliding manner, any one of the at least one application option included in the application. Further, when the user terminal receives a touch instruction for an application option in the at least one application option included in the application, the user terminal may use the application option as a target application option, and display, in response to the touch instruction, an application interface corresponding to the target application option.

Figure 4:
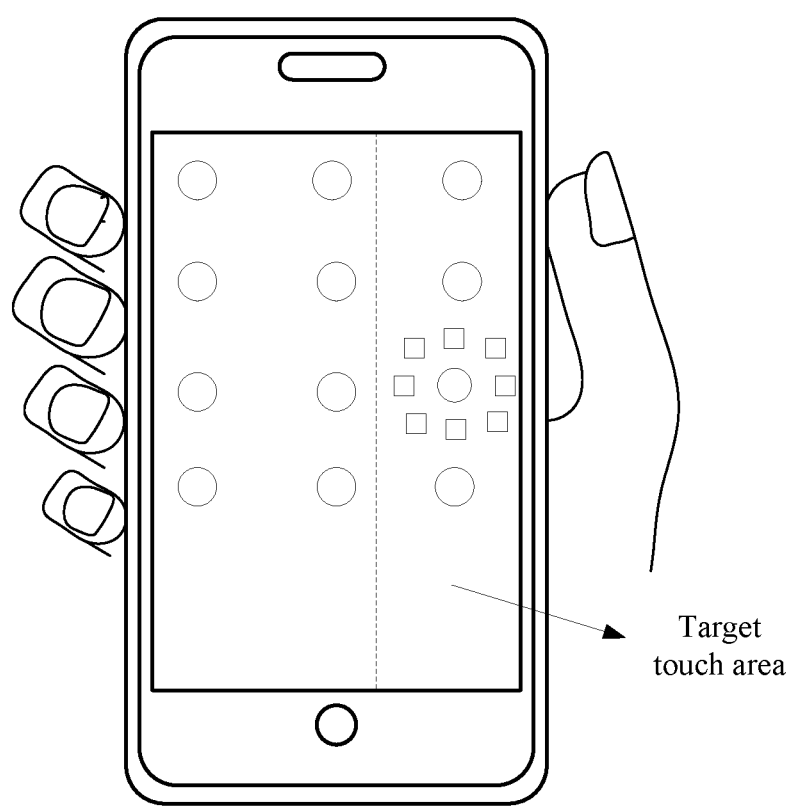
FIG. 4 is a schematic diagram of another human-computer interaction interface of a user terminal according to an embodiment of the present invention.

Referring to FIG. 4, FIG. 4 is a schematic diagram of another human-computer interaction interface of a user terminal according to an embodiment of the present invention. As shown in FIG. 4, the user terminal divides the interface into two parts. A target touch area that can be touched in a current holding manner of a user is an area on the right side of a dotted line. The user terminal may display, in the target touch area, an application icon of an application bound to fingerprint information, and display, in a surrounding area of the application icon of the application, at least one application option included in the application. In this way, the user can quite easily touch, with one hand, any application option that is in the application and that is displayed in the target touch area, so that user experience can be improved.

In another optional implementation manner, after step S102, the user terminal may further perform the following steps.

(41) Obtain overall evaluation information of application options included in the application, where the overall evaluation information of the application options includes overall evaluation indexes.

(42) If an overall evaluation index included in overall evaluation information of an application option exceeds a preset evaluation index threshold, determine the application option as a target application option.

A specific implementation manner of step S103 may be: displaying the target application option.

In this implementation manner, after the user terminal determines the application bound to the target fingerprint information, the user terminal may obtain the overall evaluation information of the application options included in the application, determine the target application option according to the overall evaluation indexes included in the overall evaluation information of the application options, and display the target application option. The overall evaluation information may include various types of experience information (such as user-friendly, convenient, or significantly not as described) and rating information of the application (such as 3 scores or 5 scores) that are obtained after the user uses the application. The user terminal may use a rating of the application as an overall evaluation index of the application. It may be learned that in this manner, a target application option with relatively high evaluation can be recommended to a user, and user experience can be improved.

In another optional implementation manner, after step S103, the user terminal may further perform the following steps.

(51) Obtain a slide instruction for sliding in a preset direction by using an input position of the fingerprint information as a start position, where the slide instruction includes the preset direction, the preset direction is used to indicate a target application option, and the target application option is any one of the at least one application option displayed on the user terminal.

(52) Display, in response to the slide instruction, an interface corresponding to the target application option.

In this implementation manner, after the user terminal displays the at least one application option included in the application, the user may perform a slide operation by using the input position of the fingerprint information as the start position, and trigger generation of the slide instruction. The user terminal displays, according to the target application option indicated by the preset direction included in the slide instruction, the interface corresponding to the target application option. In this way, the user can perform an operation on the interface corresponding to the target application option.

For example, assuming that the application is a social application, after the user terminal displays at least one buddy option included in the social application, the user performs a slide operation in a left direction by using the input position of the fingerprint information as the start position. If the left direction indicates a buddy option B included in the social application, the user terminal displays an interface corresponding to the buddy option B, so that the user chats with the buddy option B.

In another optional implementation manner, a specific implementation manner of step S103 may be:

displaying at least two application options included in the application.

After step S103, the user terminal may further perform the following steps.

(61) Obtain a slide instruction of a user for sliding on a touchscreen or a fingerprint sensor, where the slide instruction includes a slide direction.

(62) Determine, according to a mapping relationship between a start position of the sliding and a central position of the at least two application options, by using the central position as a reference, and according to the slide direction, a first application option in the at least two application options displayed on the user terminal.

(63) Display an interface corresponding to the first application option.

In this implementation manner, after the user terminal determines the application bound to the target fingerprint information, the user terminal may display the at least two application options included in the application. The user may perform a slide operation on any position of the touchscreen or the fingerprint sensor, and trigger generation of the slide instruction. After obtaining the slide instruction, the user terminal determines, according to the mapping relationship between the start position of the sliding and the central position of the at least two application options, by using the central position as a reference, and according to the slide direction, the first application option in the at least two application options displayed on the user terminal, and displays the interface corresponding to the first application option. The central position may be a midpoint position of a connection line between two application options, or may be a central position of all application options presented in a honeycomb shape.

Figure 5:
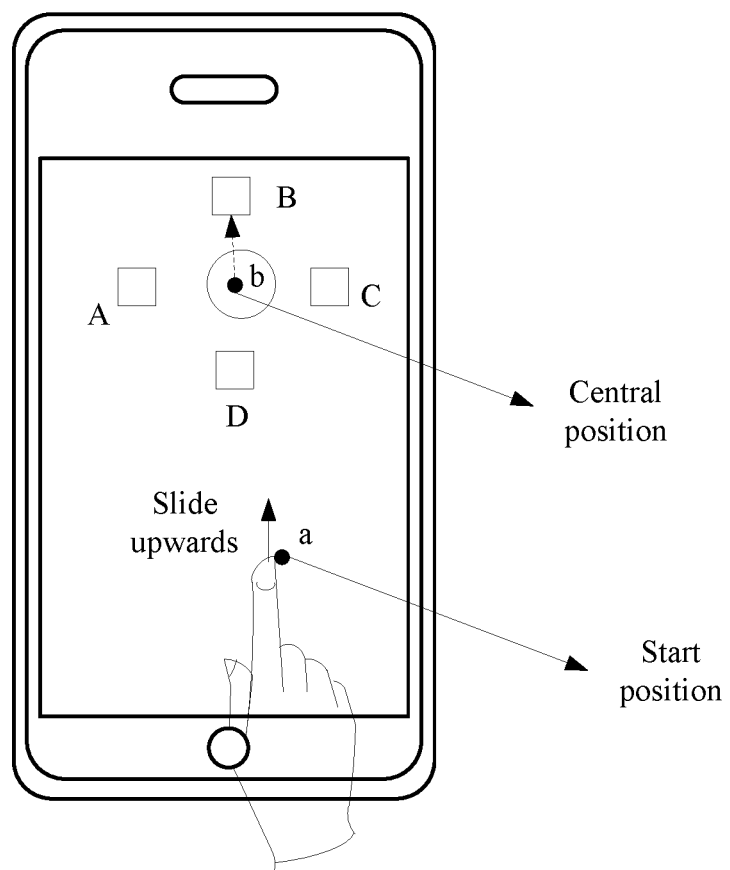
FIG. 5 is a schematic diagram of another human-computer interaction interface of a user terminal according to an embodiment of the present invention.

Referring to FIG. 5, FIG. 5 is a schematic diagram of another human-computer interaction interface of a user terminal according to an embodiment of the present invention. As shown in FIG. 5, four application options are displayed on the user terminal, and include an application option A, an application option B, an application option C, and an application option D. A start position for performing, by a user, a slide operation on a touchscreen or a fingerprint sensor is a point a, and a slide direction is upward. The user terminal may determine, according to a mapping relationship between the start position of the sliding and a central position of at least two application options, that a central position to which the point a is mapped is a point b. Further, the user terminal may determine, by using the central position, the point b, as a reference and according to the upward slide direction, that a first application option in the at least two application options displayed on the user terminal is the application option B. In this case, the user terminal may display an interface corresponding to the application option B.

In the method procedure depicted in FIG. 1, a user terminal may collect entered fingerprint information. If target fingerprint information that matches the fingerprint information exists in stored preset fingerprint information, the user terminal may determine an application bound to the target fingerprint information. Further, the user terminal may display at least one application option included in the application. It may be learned that in this embodiment of the present invention, after a user enters the fingerprint information, the user does not need to tap an application, and search for an application option after an application interface is entered and an option in the application is displayed; instead, the application bound to the fingerprint information may be directly determined, and the application option included in the application may be displayed, so as to improve application option search efficiency.

Figure 6A:
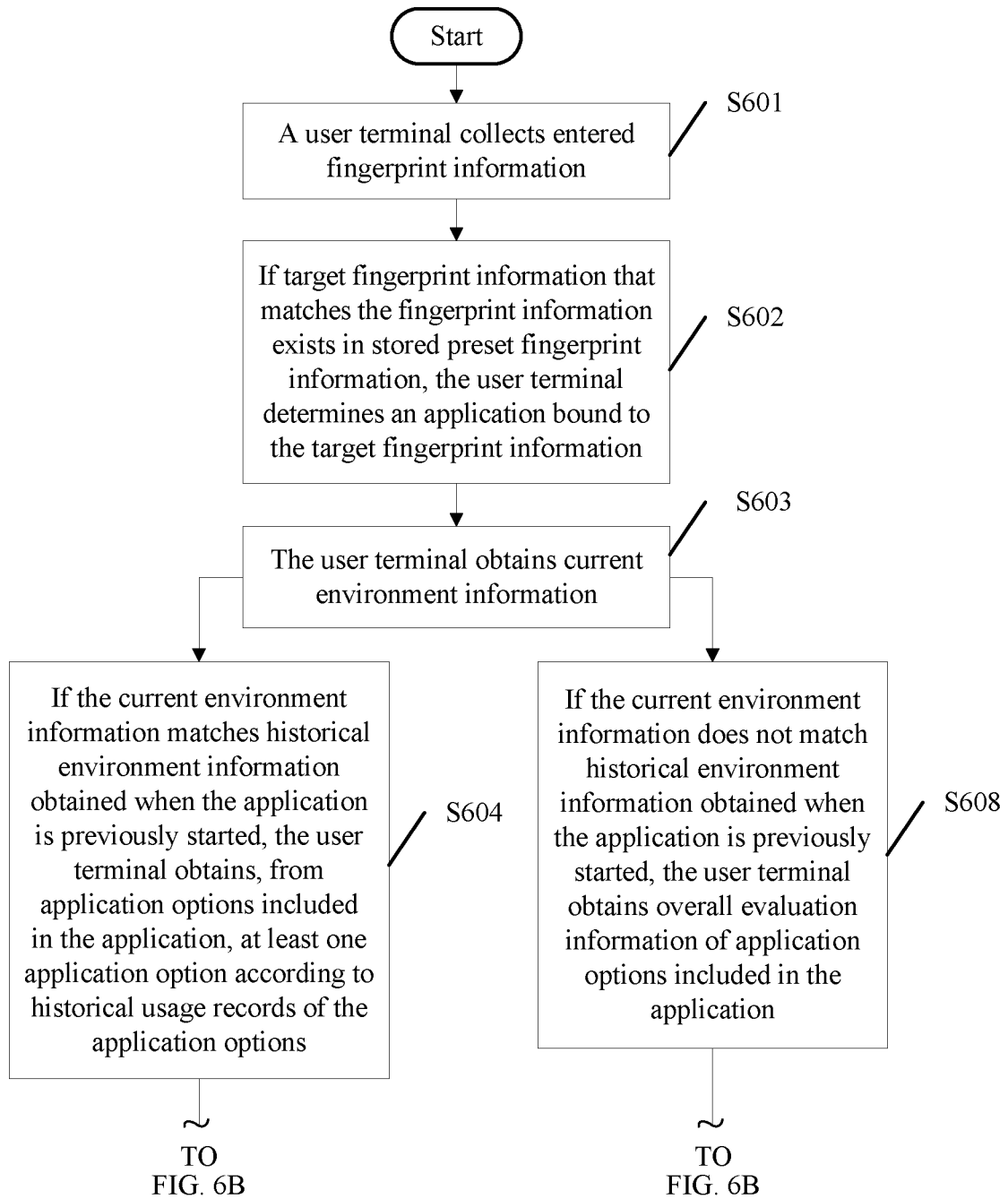
FIG. 6A and FIG. 6B are a schematic flowchart of another human-computer interaction method of a user terminal according to an embodiment of the present invention.
Figure 6B:
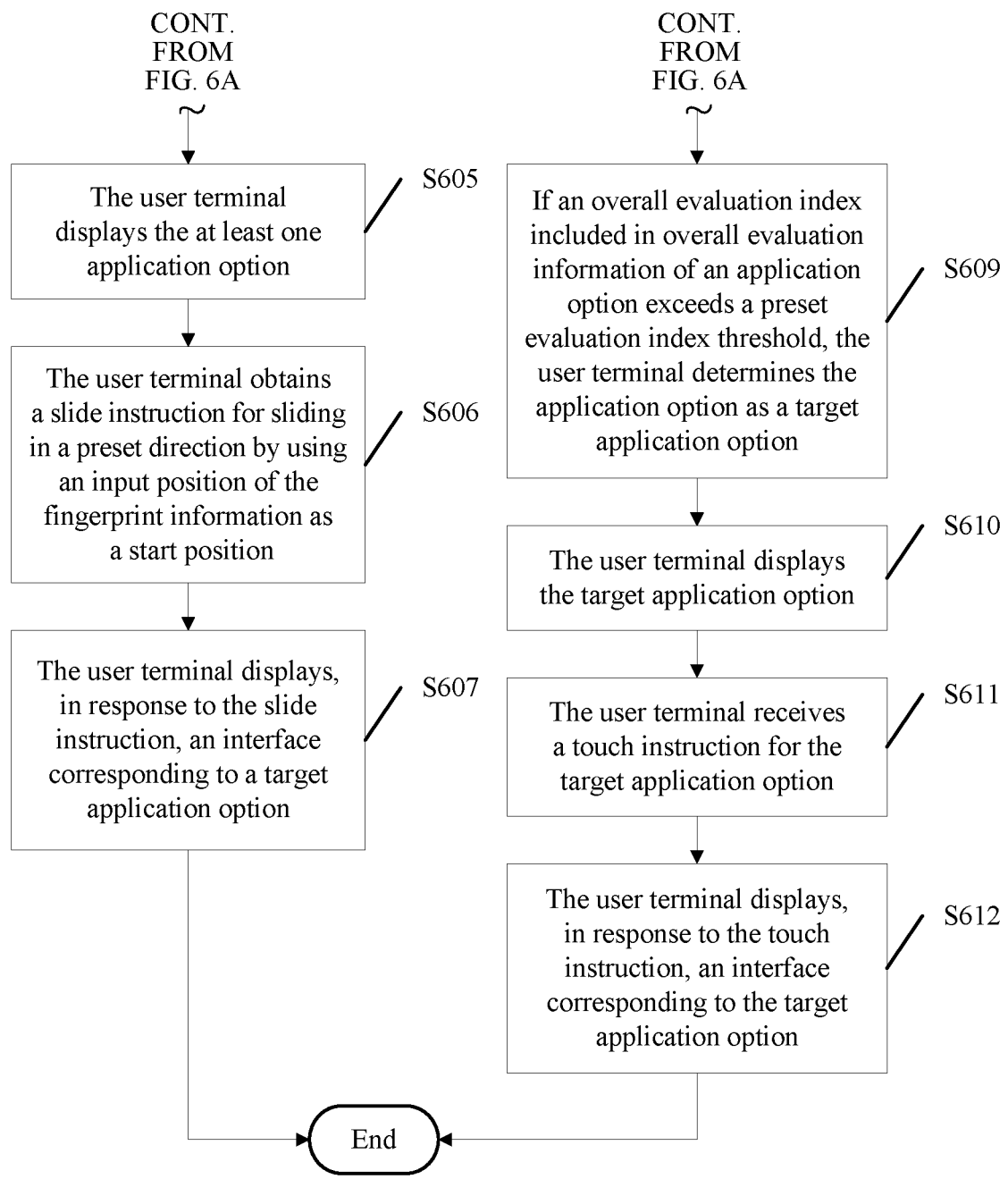

Referring to FIG. 6A and FIG. 6B, FIG. 6A and FIG. 6B are a schematic flowchart of another human-computer interaction method of a user terminal according to an embodiment of the present invention. As shown in FIG. 6A and FIG. 6B, the method may include the following steps.

S601. The user terminal collects entered fingerprint information.

S602. If target fingerprint information that matches the fingerprint information exists in stored preset fingerprint information, the user terminal determines an application bound to the target fingerprint information.

S603. The user terminal obtains current environment information.

In this embodiment of the present invention, the user terminal may interact with a network server by using the Internet, so that the current environment information can be obtained; or the user terminal may obtain the current environment information by using various types of sensors built in the user terminal.

In this embodiment of the present invention, the current environment information is environment information of an environment in which the user terminal currently exists. The current environment information may include but be not limited to a current time, a current position, current weather information, and the like. Specifically, the current time may be a current time point, such as 12 o'clock in the morning; or the current time may be a current date, such as March $21^{st}$. The current position may be a geographic position at which the user terminal is currently located, such as $30^{th}$ parallel north; or the current position may be a regional position at which the user terminal is currently located, such as Shenzhen. The current weather information may include but be not limited to various weather parameters such as temperature, a wind speed, ultraviolet intensity, relative humidity, and a precipitation amount. This is not limited in this embodiment of the present invention.

S604. If the current environment information matches historical environment information obtained when the application is previously started, the user terminal obtains, from application options included in the application, at least one application option according to historical usage records of the application options.

In this embodiment of the present invention, a manner in which the current environment information matches the historical environment information obtained when the application is previously started specifically includes at least one of the following:

the current time included in the current environment information matches a historical enabling start time included in the historical environment information obtained when the application is previously started;

the current position at which the user terminal is located and that is included in the current environment information matches a historical position at which the user terminal is located and that is included in the historical environment information obtained when the application is previously started; or the current weather information included in the current environment information matches historical weather information of the user terminal that is included in the historical environment information obtained when the application is previously started.

That the current time included in the current environment information matches the historical enabling start time included in the historical environment information obtained when the application is previously started may be: the current time included in the current environment information is the same as the historical enabling start time included in the historical environment information obtained when the application is previously started; or the historical enabling start time included in the historical environment information obtained when the application is previously started is preset duration later than the current time included in the current environment information.

That the current position at which the user terminal is located and that is included in the current environment information matches the historical position at which the user terminal is located and that is included in the historical environment information obtained when the application is previously started may be: longitude and latitude of the current position at which the user terminal is located and that is included in the current environment information are the same as longitude and latitude of the historical position at which the user terminal is located and that is included in the historical environment information obtained when the application is previously started; or a geographic area of the current position at which the user terminal is located and that is included in the current environment information is consistent with a geographic area of the historical position at which the user terminal is located and that is included in the historical environment information obtained when the application is previously started.

That the current weather information included in the current environment information matches the historical weather information included in the historical environment information obtained when the application is previously started may be: each type of weather parameters in the historical weather information included in the historical environment information obtained when the application is previously started and in the current weather information included in the current environment information have same values, and this holds true for most weather parameters of same types; or a difference between a weather parameter in the historical weather information included in the historical environment information obtained when the application is previously started and a weather parameter in the current weather information included in the current environment information is less than a preset threshold. The two weather parameters belong to one type.

In this embodiment of the present invention, a specific implementation manner in which the user terminal obtains, from the application options included in the application, the at least one application option according to the historical usage records of the application options may be:

obtaining use frequencies of multiple application options according to the historical usage records of the application options included in the application; and obtaining a preset quantity of application options in descending order of the use frequencies, and determining the preset quantity of application options as at least one application option; or obtaining use frequencies of multiple application options according to the historical usage records of the application options included in the application; and if a use frequency of an application option exceeds a preset use frequency threshold, determining the application option as at least one application option; or obtaining use frequencies of multiple application options according to the historical usage records of the application options included in the application; sorting, in descending order of the use frequencies, the application options included in the application; determining a quantity of at least one application option according to a specified preset quantity ratio of the application options included in the application to the at least one application option; and obtaining the quantity of at least one application option from sorted application options in the descending order of the use frequencies.

The use frequency is used to indicate a quantity of times of using the application option in a preset time. A higher use frequency indicates a larger quantity of times of using the application option in the preset time.

In this embodiment of the present invention, after the user terminal obtains the use frequencies of the multiple application options according to the historical usage records of the application options included in the application, if a user presets a preset display quantity of application options, the user terminal may sort, in the descending order of the use frequencies, the application options included in the application, and obtain, in a sorting order, the preset quantity of application options that rank higher. For example, assuming that sorted application options are sequentially A, B, C, D, E, F, and G, and a preset quantity is 3, the user terminal may obtain the top three application options: A, B, and C.

If a user presets the preset quantity ratio (such as 10:1) of the application options included in the application to the to-be-displayed at least one application option, the user terminal may first determine a display quantity of to-be-displayed application options, then sort, in the descending order of the use frequencies, the application options included in the application, and obtain, in a sorting order, the display quantity of application options that rank higher. For example, assuming that 100 application options are included in an application, and a preset quantity ratio is 10:1, it may be determined that a display quantity of to-be-displayed application options is 10, and the user terminal may sort the application options included in the application, and obtain the top ten application options in a sorting order.

Optionally, after the user terminal obtains the use frequencies of the multiple application options according to the historical usage records of the application options included in the application, the user terminal may not need to sort the application options included in the application, and the user terminal may determine whether a use frequency of each application option exceeds the preset use frequency threshold. The preset use frequency threshold is a critical use frequency value used to learn, by means of differentiation, whether the user often uses an application option. When a use frequency of an application option exceeds the preset use frequency threshold, the user terminal may determine the application option as a common application option, and use the application option as to-be-displayed at least one application option.

S605. The user terminal displays the at least one application option.

In this embodiment of the present invention, a specific implementation manner in which the user terminal displays the at least one application option may be:

displaying a floating window on a fingerprint information input interface; displaying, on the floating window, an interface on which an application icon of the application is located; displaying the application icon of the application in a central area of the interface, and hiding an icon other than the application icon of the application in multiple application icons included in the interface; and displaying the at least one application option around the application icon of the application; or displaying an interface on which an application icon of the application is located; displaying a floating window on the interface, and displaying, on the floating window, multiple application icons included in the interface; and displaying the at least one application option in a surrounding area of the application icon that is of the application and that is displayed on the floating window, where the surrounding area is an area that falls within a preset range and that is centered on the application icon of the application.

S606. The user terminal obtains a slide instruction for sliding in a preset direction by using an input position of the fingerprint information as a start position.

In this embodiment of the present invention, the slide instruction includes the preset direction, the preset direction is used to indicate a target application option, and the target application option is any one of the at least one application option displayed on the user terminal.

In this embodiment of the present invention, the user may preset a correspondence between a slide direction and an application option. For example, sliding leftwards is corresponding to an application option A, sliding rightwards is corresponding to an application option B, sliding upwards is corresponding to an application option C, and sliding downwards is corresponding to an application option D.

After the user terminal displays the at least one application option, the user terminal may detect and obtain the slide instruction for sliding in the preset direction by using the input position of the fingerprint information as the start position, and query, according to the preset direction included in the slide instruction, the target application option corresponding to the preset direction. In this way, the user terminal can determine the target application option.

For example, assuming that the application is a social application, after the user terminal displays at least one buddy option included in the social application, the user performs a slide operation in a left direction by using the input position of the fingerprint information as the start position, and the user terminal performs a query in a correspondence between a slide direction and a buddy option, so that it can be determined that a buddy option corresponding to the left direction is a buddy option B.

S607. The user terminal displays, in response to the slide instruction, an interface corresponding to a target application option, and ends this procedure.

In an optional implementation manner, after step S605, the user terminal may perform the following steps instead of steps S606 and S607.

(11) Receive a touch instruction for a target application option in the displayed at least one application option.

(12) Display, in response to the touch instruction, an interface corresponding to the target application option, and end this procedure.

In this implementation manner, the user may directly trigger generation of the touch instruction for the target application option by tapping or sliding the target application option. After receiving the touch instruction, the user terminal may display, in response to the touch instruction, the interface corresponding to the target application option.

S608. If the current environment information does not match historical environment information obtained when the application is previously started, the user terminal obtains overall evaluation information of application options included in the application.

In this embodiment of the present invention, if the current environment information does not match the historical environment information obtained when the application is previously started, the user terminal may obtain, from a network by using the Internet, the overall evaluation information of the application options included in the application. The overall evaluation information of the application options includes overall evaluation indexes. The overall evaluation information may include various types of experience information (such as user-friendly, convenient, or significantly not as described) and rating information of the application (such as 3 scores or 5 scores) that are obtained after the user uses the application. The user terminal may use a rating of the application as an overall evaluation index of the application.

S609. If an overall evaluation index included in overall evaluation information of an application option exceeds a preset evaluation index threshold, the user terminal determines the application option as a target application option.

In this embodiment of the present invention, if an overall evaluation index included in overall evaluation information of an application option exceeds the preset evaluation index threshold, it indicates that the application option is accepted by most users and is highly evaluated, and the user terminal may recommend the application option to a current user.

In an optional implementation manner, if an overall evaluation index included in overall evaluation information of an application option exceeds the preset evaluation index threshold, and a position at which the application option is located falls within a range of a target area, the user terminal may determine the application option as a target application option. The target area is an area that falls within a preset range and that is centered on a position at which the user terminal is currently located.

For example, assuming that the application is a group buying application, if a shop overall evaluation index of each shop option in the group buying application exceeds a preset evaluation index threshold, it indicates that the shop is highly evaluated. Further, if a position at which a shop of the shop option is located falls within a range of a target area, it indicates that the shop is relatively close to a current position of the user, and the user terminal may determine, as a target shop option, the highly evaluated shop option that is close to the current position at which the user terminal is located, and recommend the shop option to the current user.

S610. The user terminal displays the target application option.

S611. The user terminal receives a touch instruction for the target application option.

In this embodiment of the present invention, after the user terminal displays the target application option, the user terminal may receive the touch instruction for the target application option. The touch instruction may be a touch instruction that is for the target application option and that is generated by means of triggering by the user by tapping or sliding the target application option.

S612. The user terminal displays, in response to the touch instruction, an interface corresponding to the target application option.

In the method embodiment depicted in FIG. 6A and FIG. 6B, a user terminal may display, to a user according to current environment information, at least one application option that matches the current environment information, determine a target application option according to a slide direction of the user, and display an interface corresponding to the target application option; or may display a highly evaluated target application option to a user according to overall evaluation information of application options included in an application, and display an interface corresponding to the target application option. In this way, an individual demand of the user can be met purposefully, and user experience can also be improved.

Figure 7A:
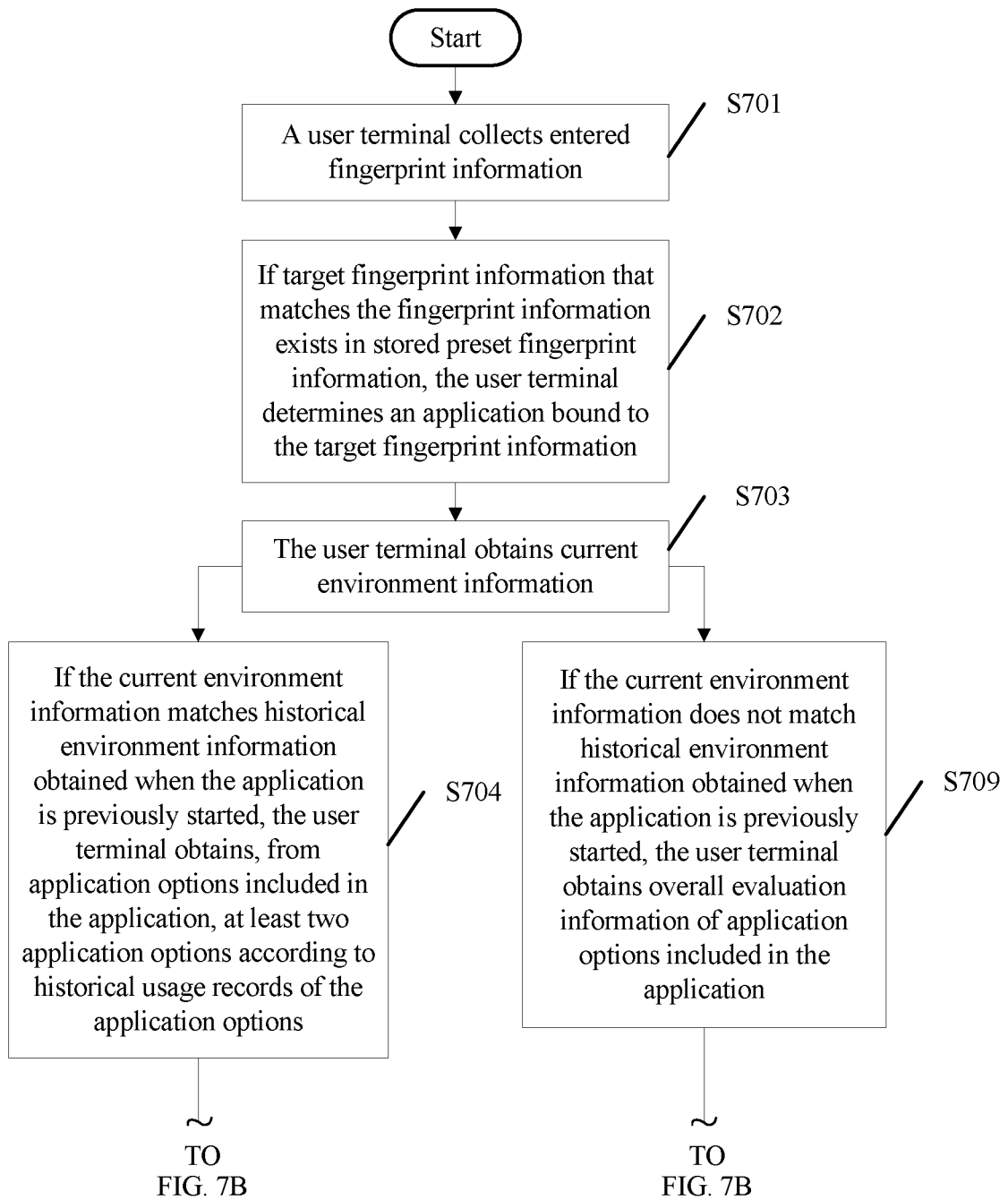
FIG. 7A and FIG. 7B are a schematic flowchart of another human-computer interaction method of a user terminal according to an embodiment of the present invention.
Figure 7B:
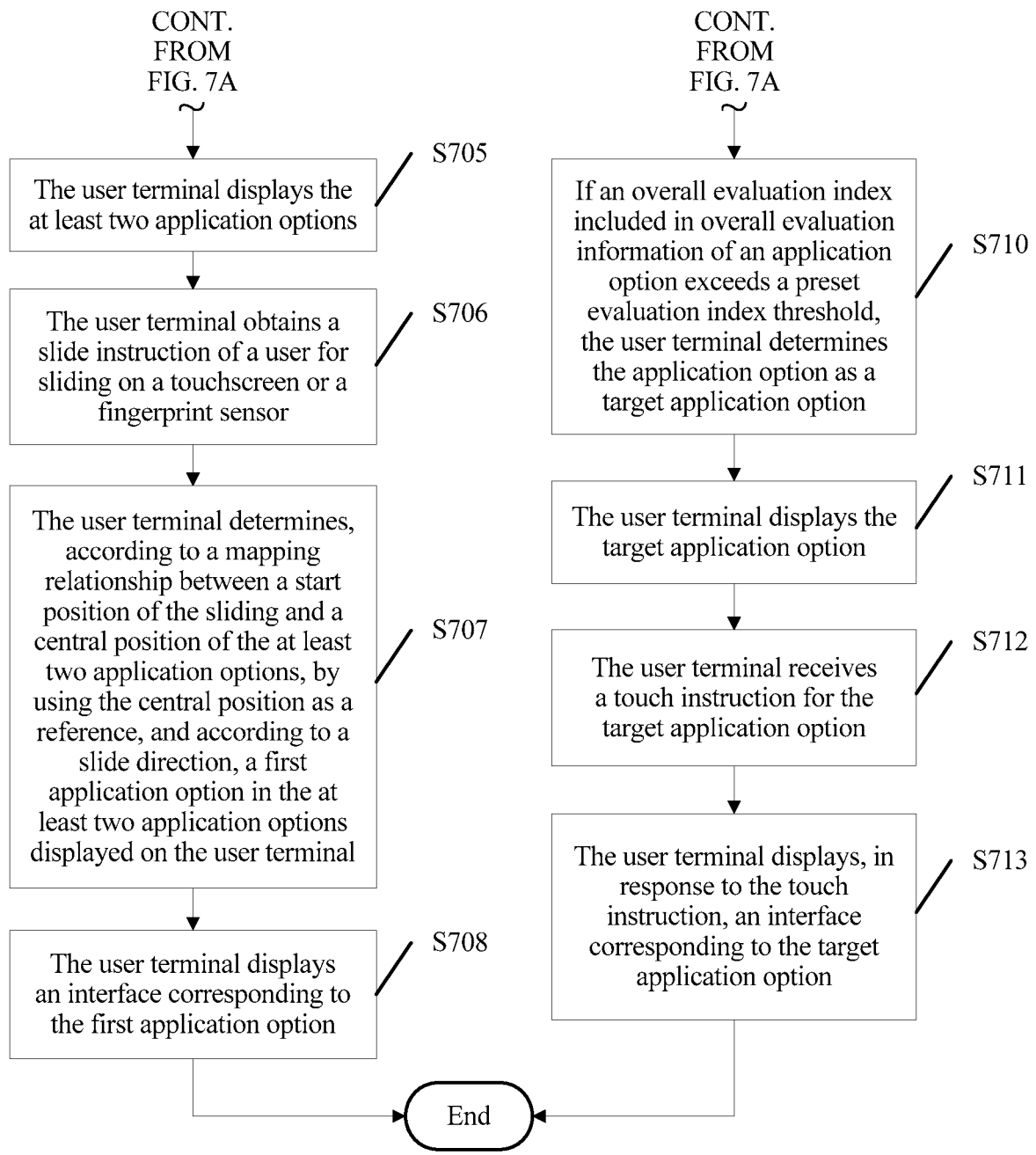

Referring to FIG. 7A and FIG. 7B, FIG. 7A and FIG. 7B are a schematic flowchart of another human-computer interaction method of a user terminal according to an embodiment of the present invention. As shown in FIG. 7A and FIG. 7B, the method may include the following steps.

S701. The user terminal collects entered fingerprint information.

S702. If target fingerprint information that matches the fingerprint information exists in stored preset fingerprint information, the user terminal determines an application bound to the target fingerprint information.

S703. The user terminal obtains current environment information.

S704. If the current environment information matches historical environment information obtained when the application is previously started, the user terminal obtains, from application options included in the application, at least two application options according to historical usage records of the application options.

S705. The user terminal displays the at least two application options.

S706. The user terminal obtains a slide instruction of a user for sliding on a touchscreen or a fingerprint sensor.

In this embodiment of the present invention, the slide instruction includes a slide direction. The touchscreen may be used as a full-screen fingerprint sensor, or may be used as a part-screen fingerprint sensor. When the touchscreen is a full-screen fingerprint sensor, the user may perform a slide operation at any position of the touchscreen. When the touchscreen is a part-screen fingerprint sensor, the user needs to perform a slide operation in a part-screen area in which a fingerprint sensor is disposed.

S707. The user terminal determines, according to a mapping relationship between a start position of the sliding and a central position of the at least two application options, by using the central position as a reference, and according to a slide direction, a first application option in the at least two application options displayed on the user terminal.

In this embodiment of the present invention, if two application options are displayed on the user terminal, the central position may be a midpoint position of a connection line between the two application options. If at least three application options are displayed on the user terminal, and the at least three application options are presented in a honeycomb shape, the central position may be a central position of the honeycomb shape.

Referring to FIG. 5, FIG. 5 is a schematic diagram of another human-computer interaction interface of a user terminal according to an embodiment of the present invention. As shown in FIG. 5, four application options are displayed on the user terminal, and include an application option A, an application option B, an application option C, and an application option D. A start position for performing, by a user, a slide operation on a touchscreen or a fingerprint sensor is a point a, and a slide direction is upward. The user terminal may determine, according to a mapping relationship between the start position of the sliding and a central position of at least two application options, that a central position to which the point a is mapped is a point b. Further, the user terminal may determine, by using the central position, the point b, as a reference and according to the upward slide direction, that a first application option in the at least two application options displayed on the user terminal is the application option B. In this case, the user terminal may display an interface corresponding to the application option B.

S708. The user terminal displays an interface corresponding to the first application option, and ends this procedure.

In an optional implementation manner, after step S705, the user terminal may perform the following steps instead of steps S706 to S708.

(11) Receive a touch instruction for a target application option in the displayed at least two application options.

(12) Display, in response to the touch instruction, an interface corresponding to the target application option, and end this procedure.

In this implementation manner, the user may directly trigger generation of the touch instruction for the target application option by tapping or sliding the target application option. After receiving the touch instruction, the user terminal may display, in response to the touch instruction, the interface corresponding to the target application option.

S709. If the current environment information does not match historical environment information obtained when the application is previously started, the user terminal obtains overall evaluation information of application options included in the application.

S710. If an overall evaluation index included in overall evaluation information of an application option exceeds a preset evaluation index threshold, the user terminal determines the application option as a target application option.

S711. The user terminal displays the target application option.

S712. The user terminal receives a touch instruction for the target application option.

S713. The user terminal displays, in response to the touch instruction, an interface corresponding to the target application option.

In the method embodiment depicted in FIG. 7A and FIG. 7B, a user terminal may display, to a user according to current environment information, at least two application options that match the current environment information, determine a first application option in the at least two application options according to a mapping relationship between a start position of sliding and a central position, and display an interface corresponding to the first application option; or may display a highly evaluated target application option to a user according to overall evaluation information of application options included in an application, and display an interface corresponding to the target application option. In this way, an individual demand of the user can be met purposefully, and user experience can also be improved.

Figure 8:
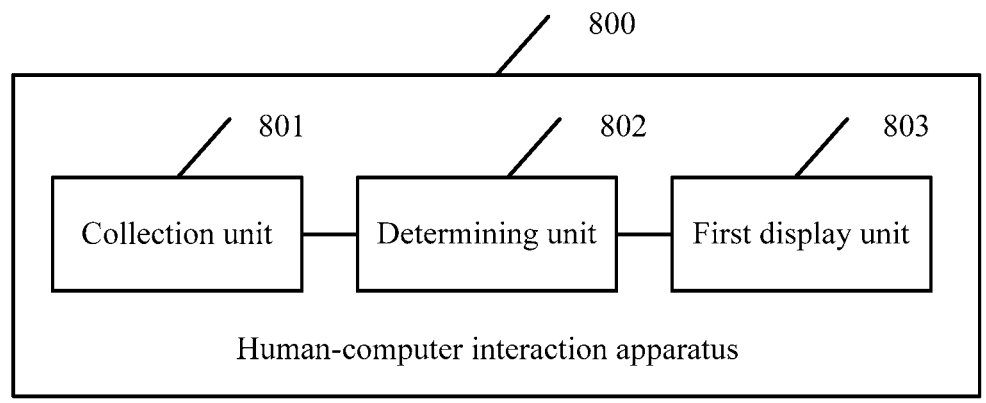
FIG. 8 is a schematic structural diagram of a human-computer interaction apparatus according to an embodiment of the present invention.

Referring to FIG. 8, FIG. 8 is a schematic structural diagram of a human-computer interaction apparatus according to an embodiment of the present invention. A human-computer interaction apparatus 800 shown in FIG. 8 may be configured to execute the human-computer interaction method of the user terminal disclosed in FIG. 1. For descriptions of technical features of FIG. 8, refer to descriptions in FIG. 1. Details are not described herein again. As shown in FIG. 8, the human-computer interaction apparatus 800 may include:

a collecting unit 801, configured to collect entered fingerprint information;

a determining unit 802, configured to: if target fingerprint information that matches the fingerprint information exists in stored preset fingerprint information, determine an application bound to the target fingerprint information; and a first display unit 803, configured to display at least one application option included in the application.

A manner in which the first display unit 803 displays the at least one application option included in the application is specifically:

displaying a floating window on a fingerprint information input interface; displaying, on the floating window, an interface on which an application icon of the application is located; displaying the application icon of the application in a central area of the interface, and hiding an icon other than the application icon of the application in multiple application icons included in the interface; and displaying, around the application icon of the application, the at least one application option included in the application; or displaying an interface on which an application icon of the application is located; displaying a floating window on the interface, and displaying, on the floating window, multiple application icons included in the interface; and displaying, in a surrounding area of the application icon that is of the application and that is displayed on the floating window, the at least one application option included in the application, where the surrounding area is an area that falls within a preset range and that is centered on the application icon of the application.

Figure 9:
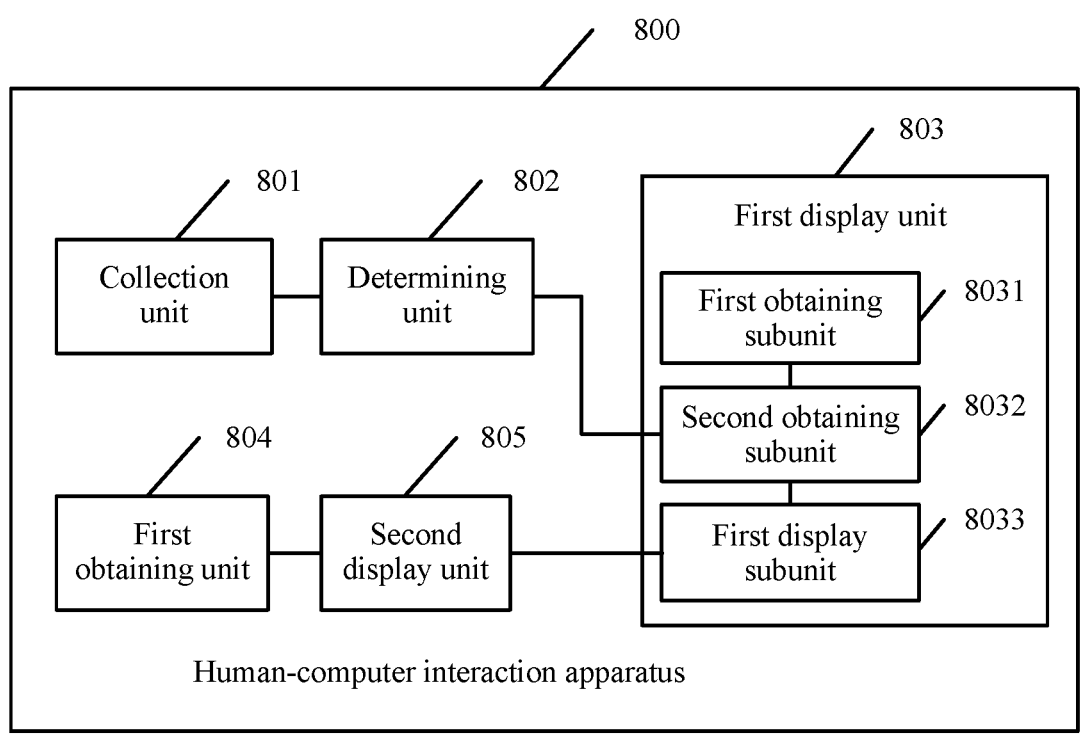
FIG. 9 is a schematic structural diagram of another human-computer interaction apparatus according to an embodiment of the present invention.

Referring to FIG. 9, FIG. 9 is a schematic structural diagram of another human-computer interaction apparatus according to an embodiment of the present invention. A human-computer interaction apparatus 800 shown in FIG. 9 may be configured to execute the human-computer interaction method of the user terminal disclosed in FIG. 6A and FIG. 6B. For descriptions of technical features of FIG. 9, refer to descriptions in FIG. 6A and FIG. 6B. Details are not described herein again. The human-computer interaction apparatus 800 shown in FIG. 9 is obtained by further optimizing the human-computer interaction apparatus 800 shown in FIG. 8. Compared with the human-computer interaction apparatus 800 shown in FIG. 8, in addition to all units in the human-computer interaction apparatus 800 shown in FIG. 8, the human-computer interaction apparatus 800 shown in FIG. 9 may include:

a first obtaining unit 804, configured to: after the first display unit 803 displays the at least one application option included in the application, obtain a slide instruction for sliding in a preset direction by using an input position of the fingerprint information as a start position, where the slide instruction includes the preset direction, the preset direction is used to indicate a target application option, and the target application option is any one of the at least one application option displayed on the user terminal; and a second display unit 805, configured to display, in response to the slide instruction, an interface corresponding to the target application option.

In an optional implementation manner, the first display unit 803 shown in FIG. 9 may include a first obtaining subunit 8031, a second obtaining subunit 8032, and a first display subunit 8033.

The first obtaining subunit 8031 is configured to obtain current environment information.

The second obtaining subunit 8032 is configured to: if the current environment information matches historical environment information obtained when the application is previously started, obtain, from application options included in the application, at least one application option according to historical usage records of the application options.

A manner in which the current environment information matches the historical environment information obtained when the application is previously started specifically includes at least one of the following:

a current time included in the current environment information matches a historical enabling start time included in the historical environment information obtained when the application is previously started;

a current position at which the user terminal is located and that is included in the current environment information matches a historical position at which the user terminal is located and that is included in the historical environment information obtained when the application is previously started; or current weather information included in the current environment information matches historical weather information of the user terminal that is included in the historical environment information obtained when the application is previously started.

A manner in which the second obtaining subunit 8032 obtains, from the application options included in the application, the at least one application option according to the historical usage records of the application options is specifically:

obtaining use frequencies of multiple application options according to the historical usage records of the application options included in the application; and obtaining a preset quantity of application options in descending order of the use frequencies, and determining the preset quantity of application options as at least one application option; or obtaining use frequencies of multiple application options according to the historical usage records of the application options included in the application; and if a use frequency of the application option exceeds a preset use frequency threshold, determining the application option as at least one application option; or obtaining use frequencies of multiple application options according to the historical usage records of the application options included in the application; sorting, in descending order of the use frequencies, the application options included in the application; determining a quantity of at least one application option according to a specified preset quantity ratio of the application options included in the application to the at least one application option; and obtaining the quantity of at least one application option from sorted application options in the descending order of the use frequencies.

The first display subunit 8033 is configured to display the at least one application option.

Figure 10:
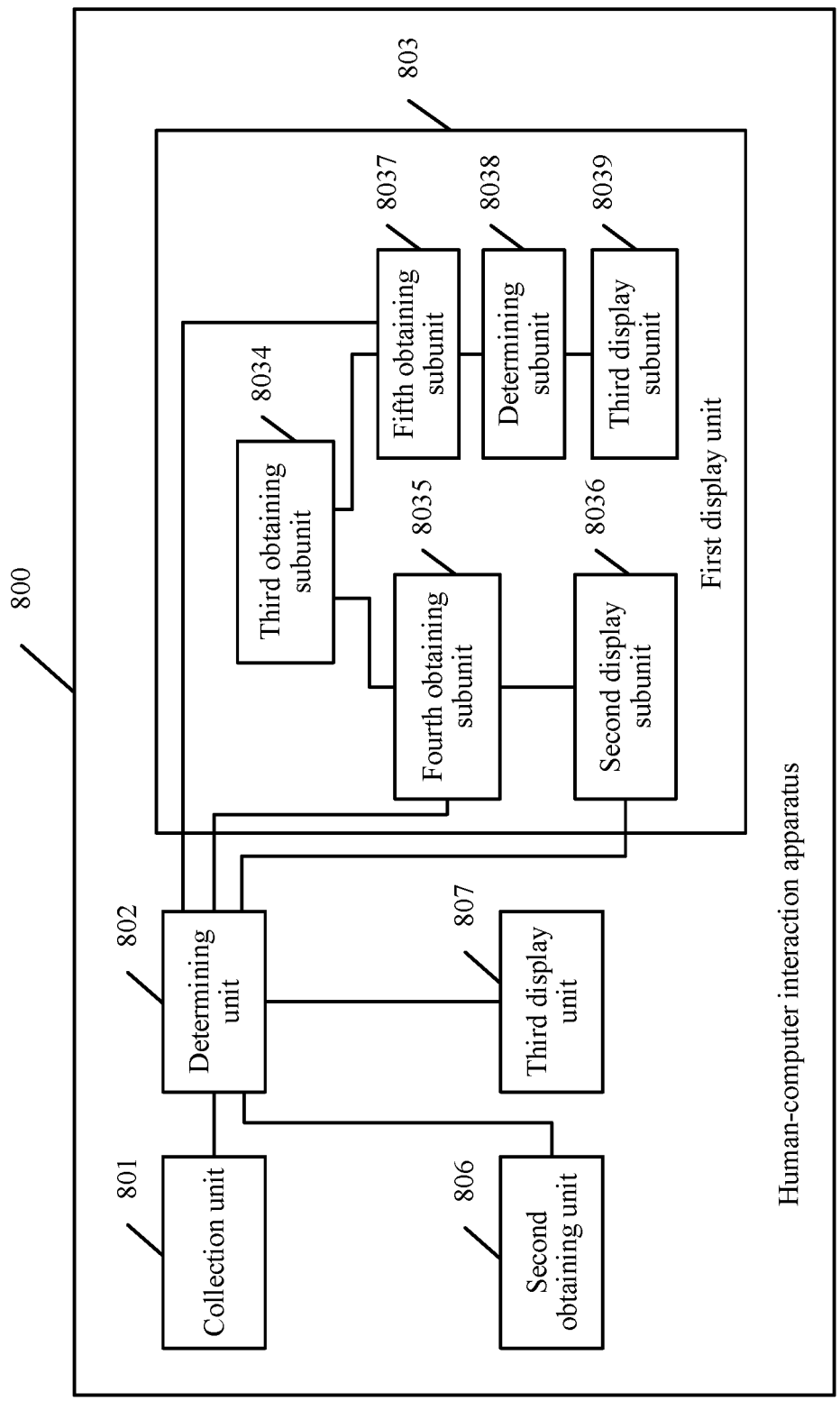
FIG. 10 is a schematic structural diagram of another human-computer interaction apparatus according to an embodiment of the present invention.

Referring to FIG. 10, FIG. 10 is a schematic structural diagram of another human-computer interaction apparatus according to an embodiment of the present invention. A human-computer interaction apparatus 800 shown in FIG. 10 may be configured to execute the human-computer interaction method of the user terminal disclosed in FIG. 7A and FIG. 7B. For descriptions of technical features of FIG. 10, refer to descriptions in FIG. 7A and FIG. 7B. Details are not described herein again. The human-computer interaction apparatus 800 shown in FIG. 10 is obtained by further optimizing the human-computer interaction apparatus 800 shown in FIG. 8. Compared with the human-computer interaction apparatus 800 shown in FIG. 8, in addition to all units in the human-computer interaction apparatus 800 shown in FIG. 8, the human-computer interaction apparatus 800 shown in FIG. 10 may include a second obtaining unit 806 and a third display unit 807.

A manner in which the first display unit 803 displays the at least one application option included in the application is specifically: displaying at least two application options included in the application.

The second obtaining unit 806 is configured to obtain a slide instruction of a user for sliding on a touchscreen or a fingerprint sensor. The slide instruction includes a slide direction.

The determining unit 802 is further configured to determine, according to a mapping relationship between a start position of the sliding and a central position of the at least two application options, by using the central position as a reference, and according to the slide direction, a first application option in the at least two application options displayed on the user terminal.

The third display unit 807 is configured to display an interface corresponding to the first application option.

In an optional implementation manner, the first display unit 803 shown in FIG. 10 may include a third obtaining subunit 8034, a fourth obtaining subunit 8035, and a second display subunit 8036.

The third obtaining subunit 8034 is configured to obtain current environment information.

The fourth obtaining subunit 8035 is configured to: if the current environment information matches historical environment information obtained when the application is previously started, obtain, from application options included in the application, at least two application options according to historical usage records of the application options.

A manner in which the current environment information matches the historical environment information obtained when the application is previously started specifically includes at least one of the following:

a current time included in the current environment information matches a historical enabling start time included in the historical environment information obtained when the application is previously started;

a current position at which the user terminal is located and that is included in the current environment information matches a historical position at which the user terminal is located and that is included in the historical environment information obtained when the application is previously started; or current weather information included in the current environment information matches historical weather information of the user terminal that is included in the historical environment information obtained when the application is previously started.

A manner in which the fourth obtaining subunit 8035 obtains, from the application options included in the application, the at least two application options according to the historical usage records of the application options is specifically:

obtaining use frequencies of multiple application options according to the historical usage records of the application options included in the application; and obtaining a preset quantity of application options in descending order of the use frequencies, and determining the preset quantity of application options as at least two application options; or obtaining use frequencies of multiple application options according to the historical usage records of the application options included in the application; and if a use frequency of the application option exceeds a preset use frequency threshold, determining the application option as at least two application options; or obtaining use frequencies of multiple application options according to the historical usage records of the application options included in the application; sorting, in descending order of the use frequencies, the application options included in the application; determining a quantity of at least two application options according to a specified preset quantity ratio of the application options included in the application to the at least two application options; and obtaining the quantity of at least two application options from sorted application options in the descending order of the use frequencies.

The second display subunit 8036 is configured to display the at least two application options.

In another optional implementation manner, the first display unit 803 shown in FIG. 10 may further include:

a fifth obtaining subunit 8037, configured to: if the current environment information does not match the historical environment information obtained when the application is previously started, obtain overall evaluation information of the application options included in the application, where the overall evaluation information of the application options includes overall evaluation indexes;

a determining subunit 8038, configured to: if an overall evaluation index included in overall evaluation information of the application option exceeds a preset evaluation index threshold, determine the application option as a target application option; and a third display subunit 8039, configured to display the target application option.

Figure 11:
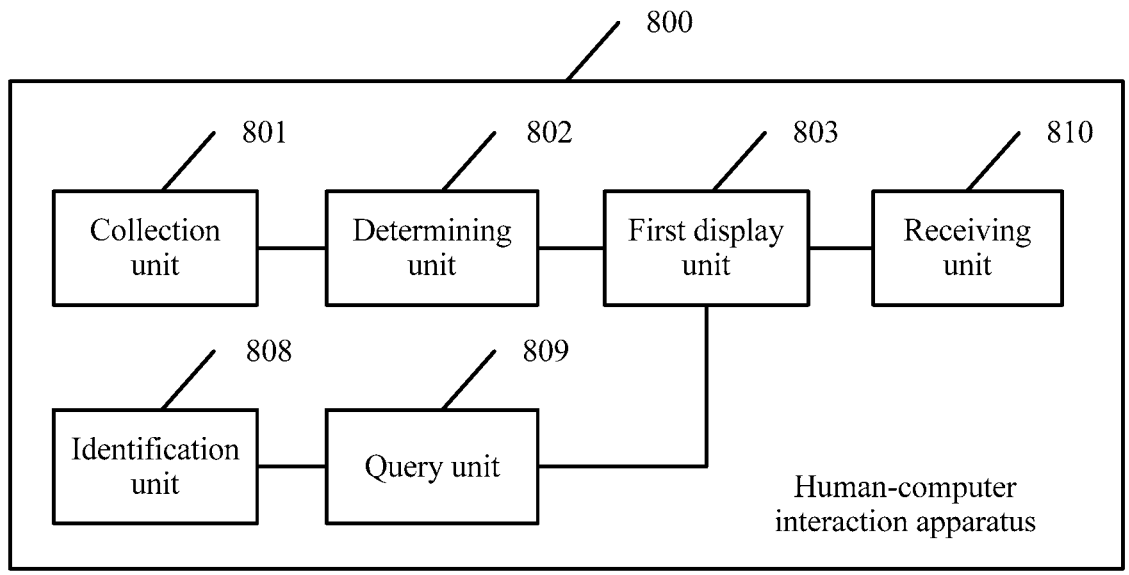
FIG. 11 is a schematic structural diagram of another human-computer interaction apparatus according to an embodiment of the present invention.

Referring to FIG. 11, FIG. 11 is a schematic structural diagram of another human-computer interaction apparatus according to an embodiment of the present invention. A human-computer interaction apparatus 800 shown in FIG. 11 may be configured to execute the human-computer interaction method of the user terminal disclosed in FIG. 1. For descriptions of technical features of FIG. 11, refer to descriptions in FIG. 1. Details are not described herein again. The human-computer interaction apparatus 800 shown in FIG. 11 is obtained by further optimizing the human-computer interaction apparatus 800 shown in FIG. 8. Compared with the human-computer interaction apparatus 800 shown in FIG. 8, in addition to all units in the human-computer interaction apparatus 800 shown in FIG. 8, the human-computer interaction apparatus 800 shown in FIG. 11 may include:

an identification unit 808, configured to: after the determining unit 802 determines the application bound to the target fingerprint information, if a one-hand operation mode on the user terminal is started, identify, in the one-hand operation mode, a manner of holding the user terminal by a user with one hand, where the holding manner includes left-hand holding or right-hand holding; and a query unit 809, configured to query, according to a prestored correspondence between a holding manner and a touch area, a target touch area corresponding to the identified holding manner.

The first display unit 803 is specifically configured to: display an application icon of the application in the target touch area, and display, in a surrounding area of the application icon of the application, the at least one application option included in the application. The target touch area includes the surrounding area.

In an optional implementation manner, the human-computer interaction apparatus 800 shown in FIG. 11 may further include:

a receiving unit 810, configured to receive a touch instruction for a target application option in the displayed application option.

The first display unit 803 is further configured to display, in response to the touch instruction, an interface corresponding to the target application option.

Figure 12:
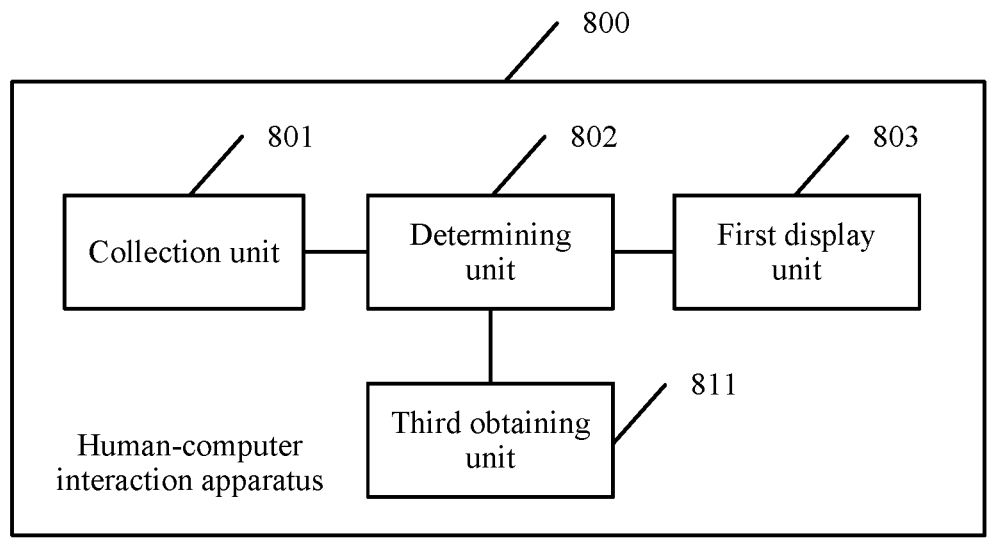
FIG. 12 is a schematic structural diagram of another human-computer interaction apparatus according to an embodiment of the present invention.

Referring to FIG. 12, FIG. 12 is a schematic structural diagram of another human-computer interaction apparatus according to an embodiment of the present invention. A human-computer interaction apparatus 800 shown in FIG. 12 may be configured to execute the human-computer interaction method of the user terminal disclosed in FIG. 1. For descriptions of technical features of FIG. 12, refer to descriptions in FIG. 1. Details are not described herein again. The human-computer interaction apparatus 800 shown in FIG. 12 is obtained by further optimizing the human-computer interaction apparatus 800 shown in FIG. 8. Compared with the human-computer interaction apparatus 800 shown in FIG. 8, in addition to all units in the human-computer interaction apparatus 800 shown in FIG. 8, the human-computer interaction apparatus 800 shown in FIG. 12 may include:

a third obtaining unit 811, configured to: after the determining unit 802 determines the application bound to the target fingerprint information, obtain overall evaluation information of application options included in the application, where the overall evaluation information of the application options includes overall evaluation indexes.

The determining unit 802 is further configured to: if an overall evaluation index included in overall evaluation information of the application option exceeds a preset evaluation index threshold, determine the application option as a target application option.

The first display unit 803 is specifically configured to display the target application option.

According to the human-computer interaction apparatus 800 depicted in FIG. 8 to FIG. 12, a collecting unit 801 may collect entered fingerprint information. If target fingerprint information that matches the fingerprint information exists in stored preset fingerprint information, a determining unit 802 may determine an application bound to the target fingerprint information. Further, a first display unit 803 may display at least one application option included in the application. It may be learned that in this embodiment of the present invention, after a user enters the fingerprint information, the user does not need to tap an application, and search for an application option after an application interface is entered and an option in the application is displayed; instead, the determining unit 802 may directly determine the application bound to the fingerprint information, and the first display unit 803 displays the application option included in the application, so as to improve application option search efficiency.

Figure 13:
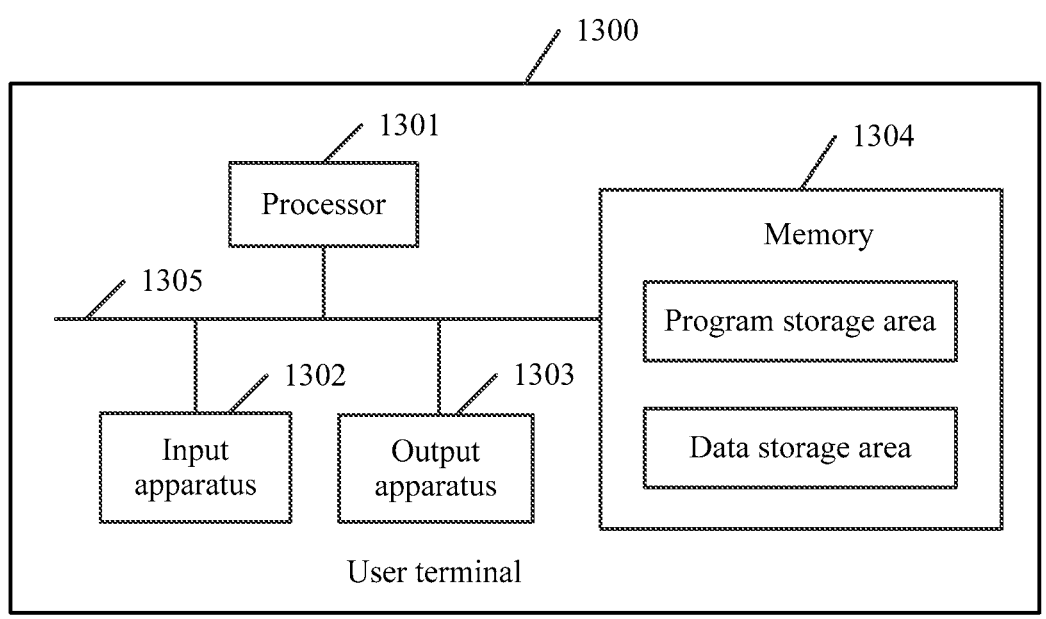
FIG. 13 is a schematic structural diagram of a user terminal according to an embodiment of the present invention.

Referring to FIG. 13, FIG. 13 is a schematic structural diagram of a user terminal according to an embodiment of the present invention. A user terminal 1300 shown in FIG. 13 may be configured to execute the human-computer interaction method disclosed in the embodiments of the present invention. As shown in FIG. 13, the user terminal 1300 may include at least one processor 1301 such as a CPU (Central Processing Unit, central processing unit), at least one input apparatus 1302, an output apparatus 1303, a memory 1304, and a communications bus 1305. A person skilled in the art may understand that a structure of the user terminal 1300 shown in FIG. 13 is not construed as a limit to the present invention. The structure may be a bus structure, or may be a star structure, and may include parts more or fewer than those shown in FIG. 13, for example, a power supply, a network interface, or a radio frequency circuit, or a combination of some parts, or parts disposed differently.

The memory 1304 is configured to store a software program and a module. The processor 1301 performs various function applications of the user terminal and data processing by running the software program and the module that are stored in the memory 1304. The memory 1304 mainly includes a program storage area and a data storage area. The program storage area may store an operating system, and an application program required by at least one function, such as a voice play program or an image play program. The data storage area may store data (such as audio data or a phone book) and the like that are created according to usage of an electronic device. In a specific implementation manner of the present invention, the memory 1304 may include a volatile memory, such as a nonvolatile dynamic random access memory (Nonvolatile Random Access Memory, NVRAM for short), a phase change random access memory (Phase Change RAM, PRAM for short), or a magnetoresistive random access memory (Magetoresistive RAM, MRAM for short), and may further include a nonvolatile memory, such as at least one magnetic disk storage device, an electrically erasable programmable read-only memory (Electrically Erasable Programmable Read-Only Memory, EEPROM for short), or a flash memory device such as a NOR flash memory (NOR flash memory) or a NAND flash memory (NAND flash memory). The foregoing application program includes any application installed on the user terminal, and includes but is not limited to a browser, an email, an instant messaging service, word processing, keyboard virtualization, a window widget (Widget), encryption, digital rights management, voice recognition, voice duplication, positioning (such as a function provided by the Global Positioning System), music play, and the like.

The communications bus 1305 is configured to implement a connection and communication between the processor 1301, the input apparatus 1302, the output apparatus 1303, and the memory 1304. The communications bus 1305 may be an industry standard architecture (Industry Standard Architecture, ISA for short) bus, a peripheral component interconnect (Peripheral Component, PCI for short) bus, an extended industry standard architecture (Extended Industry Standard Architecture, EISA for short) bus, or the like. The communications bus 1305 may fall into the following types: an address bus, a data bus, a control bus, and the like. For ease of representation, the bus is represented by using only one thick line in FIG. 13. However, this does not indicate that there is only one bus or only one type of bus.

The processor 1301 is a control center of the user terminal 1300, is connected to parts of the user terminal 1300 by using various interfaces and lines, runs or executes the software program and/or program stored in the memory 1304, and invokes data stored in the memory 1304.

The input apparatus 1302 is configured to collect entered fingerprint information;

the processor 1301 is configured to: if target fingerprint information that matches the fingerprint information exists in stored preset fingerprint information, determine an application bound to the target fingerprint information; and the output apparatus 1303 is configured to display at least one application option included in the application.

The input apparatus 1302 is configured to implement interaction between a user and the user terminal and/or enter information into the user terminal. For example, the input apparatus 1302 may receive digital or character information entered by the user, so as to generate signal input related to user setting or function control. In a specific implementation manner of the present invention, the input apparatus 1302 may be a touch panel, or may be a human-machine interaction interface of another user terminal such as a physical fingerprint sensor, or may be another external information obtaining user terminal such as a camera. The touch panel is referred to as a touchscreen, may collect an operation of touching or approaching the touch panel by the user, for example, an operation performed on the touch panel or a position near the touch panel by the user by using any proper object or accessory, such as a finger or a touchpen, and drive a corresponding connection user terminal according to a preset program. Optionally, the touch panel may include two parts: a touch detection user terminal and a touch controller. The touch detection user terminal detects a touch operation of the user, converts the detected touch operation into an electrical signal, and transfers the electrical signal to the touch controller. The touch controller receives the electrical signal from the touch detection user terminal, converts the electrical signal into contact coordinates, and sends the contact coordinates to the processor 1301. The touch controller may further receive and execute a command sent by the processor 1301. In addition, the touch panel may be implemented by using multiple types such as a resistive type, a capacitive type, an infrared ray (Infrared), and a surface acoustic wave. In some other implementation manners of the present invention, the input apparatus 1302 may be various sensors such as a position sensor, configured to detect a physical quantity of the user terminal, such as a geographical position.

The output apparatus 1303 may include but be not limited to an image output apparatus and a voice output apparatus. The image output apparatus is configured to output a text, a picture, and/or a video. The image output apparatus may include a display panel, for example, a display panel configured in a form of an LCD (Liquid Crystal Display, liquid crystal display), an OLED (Organic Light-Emitting Diode, organic light-emitting diode), a field emission display (field emission display, FED for short), or the like. Alternatively, the image output apparatus may include a reflective display, for example, an electrophoretic (electrophoretic) display or a display using an interferometric modulation of light technology (Interferometric Modulation of Light). The image output apparatus may include a single display or multiple displays of different sizes. In a specific implementation manner of the present invention, the touch panel used by the foregoing input apparatus 1302 may also be used as the display panel of the output apparatus 1303. In FIG. 13, the input apparatus 1302 and the output apparatus 1303 serve as two independent parts to implement input and output functions of the user terminal. However, in some embodiments, the touch panel and the display panel may be integrated to implement the input and output functions of the user terminal. For example, the image output apparatus may display various graphical user interfaces (Graphical User Interface, GUI for short), so as to use the graphical user interfaces as virtual control components, and the graphical user interfaces include but are not limited to a window, a scrollbar, an icon, and a scrapbook, so that the user performs an operation in a touch manner. An audio output apparatus includes a digital-to-analog converter, and the digital-to-analog converter is configured to convert an audio signal that is output by the processor 1301 from a digital format to an analog format.

In an optional implementation manner, the input apparatus 1302 is further configured to: after the output apparatus 1303 displays the at least one application option included in the application, obtain a slide instruction for sliding in a preset direction by using an input position of the fingerprint information as a start position. The slide instruction includes the preset direction, the preset direction is used to indicate a target application option, and the target application option is any one of the at least one application option displayed on the user terminal.

The output apparatus 1303 is further configured to display, in response to the slide instruction, an interface corresponding to the target application option.

In another optional implementation manner, a manner in which the output apparatus 1303 displays the at least one application option included in the application is specifically: displaying at least two application options included in the application.

The input apparatus 1302 is further configured to obtain a slide instruction of a user for sliding on a touchscreen or a fingerprint sensor. The slide instruction includes a slide direction.

The processor 1301 is further configured to determine, according to a mapping relationship between a start position of the sliding and a central position of the at least two application options, by using the central position as a reference, and according to the slide direction, a first application option in the at least two application options displayed on the user terminal.

The output apparatus 1303 is further configured to display an interface corresponding to the first application option.

In another optional implementation manner, a manner in which the output apparatus 1303 displays the at least one application option included in the application is specifically:

displaying a floating window on a fingerprint information input interface; displaying, on the floating window, an interface on which an application icon of the application is located; displaying the application icon of the application in a central area of the interface, and hiding an icon other than the application icon of the application in multiple application icons included in the interface; and displaying, around the application icon of the application, the at least one application option included in the application; or displaying an interface on which an application icon of the application is located; displaying a floating window on the interface, and displaying, on the floating window, multiple application icons included in the interface; and displaying, in a surrounding area of the application icon that is of the application and that is displayed on the floating window, the at least one application option included in the application, where the surrounding area is an area that falls within a preset range and that is centered on the application icon of the application.

In another optional implementation manner, a manner in which the output apparatus 1303 displays the at least two application options included in the application is specifically:

displaying a floating window on a fingerprint information input interface; displaying, on the floating window, an interface on which an application icon of the application is located; displaying the application icon of the application in a central area of the interface, and hiding an icon other than the application icon of the application in multiple application icons included in the interface; and displaying, around the application icon of the application, the at least two application options included in the application; or displaying an interface on which an application icon of the application is located; displaying a floating window on the interface, and displaying, on the floating window, multiple application icons included in the interface; and displaying, in a surrounding area of the application icon that is of the application and that is displayed on the floating window, the at least two application options included in the application, where the surrounding area is an area that falls within a preset range and that is centered on the application icon of the application.

In another optional implementation manner, the input apparatus 1302 is further configured to: before the output apparatus 1303 displays the at least one application option included in the application, obtain current environment information.

The processor 1301 is further configured to: if the current environment information matches historical environment information obtained when the application is previously started, obtain, from application options included in the application, at least one application option according to historical usage records of the application options.

A manner in which the processor 1301 obtains, from the application options included in the application, the at least one application option according to the historical usage records of the application options is specifically:

obtaining use frequencies of multiple application options according to the historical usage records of the application options included in the application; and obtaining a preset quantity of application options in descending order of the use frequencies, and determining the preset quantity of application options as at least one application option; or obtaining use frequencies of multiple application options according to the historical usage records of the application options included in the application; and if a use frequency of the application option exceeds a preset use frequency threshold, determining the application option as at least one application option; or obtaining use frequencies of multiple application options according to the historical usage records of the application options included in the application; sorting, in descending order of the use frequencies, the application options included in the application; determining a quantity of at least one application option according to a specified preset quantity ratio of the application options included in the application to the at least one application option; and obtaining the quantity of at least one application option from sorted application options in the descending order of the use frequencies.

In another optional implementation manner, the input apparatus 1302 is further configured to: before the output apparatus 1303 displays the at least two application options included in the application, obtain current environment information.

The processor 1301 is further configured to: if the current environment information matches historical environment information obtained when the application is previously started, obtain, from application options included in the application, at least two application options according to historical usage records of the application options.

A manner in which the processor 1301 obtains, from the application options included in the application, the at least two application options according to the historical usage records of the application options is specifically:

obtaining use frequencies of multiple application options according to the historical usage records of the application options included in the application; and obtaining a preset quantity of application options in descending order of the use frequencies, and determining the preset quantity of application options as at least two application options; or obtaining use frequencies of multiple application options according to the historical usage records of the application options included in the application; and if a use frequency of the application option exceeds a preset use frequency threshold, determining the application option as at least two application options; or obtaining use frequencies of multiple application options according to the historical usage records of the application options included in the application; sorting, in descending order of the use frequencies, the application options included in the application; determining a quantity of at least two application options according to a specified preset quantity ratio of the application options included in the application to the at least two application options; and obtaining the quantity of at least two application options from sorted application options in the descending order of the use frequencies.

A manner in which the processor 1301 determines that the current environment information matches the historical environment information obtained when the application is previously started specifically includes at least one of the following:

a current time included in the current environment information matches a historical enabling start time included in the historical environment information obtained when the application is previously started;

a current position at which the user terminal is located and that is included in the current environment information matches a historical position at which the user terminal is located and that is included in the historical environment information obtained when the application is previously started; or current weather information included in the current environment information matches historical weather information of the user terminal that is included in the historical environment information obtained when the application is previously started.

In another optional implementation manner, the processor 1301 is further configured to: after determining the application bound to the target fingerprint information, if a one-hand operation mode on the user terminal is started, identify, in the one-hand operation mode, a manner of holding the user terminal by a user with one hand, where the holding manner includes left-hand holding or right-hand holding; and query, according to a prestored correspondence between a holding manner and a touch area, a target touch area corresponding to the identified holding manner.

A manner in which the output apparatus 1303 displays the at least one application option included in the application is specifically:

displaying an application icon of the application in the target touch area, and displaying, in a surrounding area of the application icon of the application, the at least one application option included in the application, where the target touch area includes the surrounding area.

In another optional implementation manner, the input apparatus 1302 is further configured to: after the processor determines the application bound to the target fingerprint information, obtain overall evaluation information of application options included in the application. The overall evaluation information of the application options includes overall evaluation indexes.

The processor 1301 is further configured to: if an overall evaluation index included in overall evaluation information of the application option exceeds a preset evaluation index threshold, determine the application option as a target application option.

A manner in which the output apparatus 1303 displays the at least one application option included in the application is specifically:

displaying the target application option.

In another optional implementation manner, the input apparatus 1302 is further configured to: if the current environment information does not match the historical environment information obtained when the application is previously started, obtain overall evaluation information of the application options included in the application. The overall evaluation information of the application options includes overall evaluation indexes.

The processor 1301 is further configured to: if an overall evaluation index included in overall evaluation information of the application option exceeds a preset evaluation index threshold, determine the application option as a target application option.

The output apparatus 1303 is further configured to display the target application option.

In another optional implementation manner, the input apparatus 1302 is further configured to receive a touch instruction for a target application option in the displayed application option.

The output apparatus 1303 is further configured to display, in response to the touch instruction, an interface corresponding to the target application option.

According to the user terminal 1300 depicted in FIG. 13, after a user enters fingerprint information, the user does not need to tap an application, and search for an option after an application interface is entered and an option in the application is output; instead, an application bound to the fingerprint information may be directly determined, and an application option included in the application may be displayed, so as to improve application option search efficiency.

It should be noted that, for brief description, the foregoing method embodiments are represented as a series of actions. However, a person skilled in the art should appreciate that the present invention is not limited to the described order of the actions, because according to this application, some steps may be performed in other orders or simultaneously. It should be further appreciated by a person skilled in the art that the embodiments described in this specification all belong to examples of embodiments, and the involved actions and units are not necessarily required by this application.

In the foregoing embodiments, the description of each embodiment has respective focuses. For a part that is not described in detail in an embodiment, refer to related descriptions in other embodiments.

A sequence of the steps of the method in the embodiments of the present invention may be adjusted, and some steps may also be merged or removed, according to an actual requirement.

The units in the user terminal in the embodiments of the present invention may be merged, divided, and removed according to an actual requirement.

A person of ordinary skill in the art may understand that all or some of the steps of the methods in the embodiments may be implemented by a program instructing relevant hardware. The program may be stored in a computer readable storage medium. The storage medium may include a flash memory, a read-only memory (Read-Only Memory, ROM), a random access memory (Random Access Memory, RAM), a magnetic disk, an optical disc, or the like.

The human-computer interaction method of the user terminal, the apparatus, and the user terminal provided in the embodiments of the present invention are described in detail above. The principle and implementation manners of the present invention are described herein by using specific examples. The description about the embodiments of the present invention is merely provided to help understand the method and core ideas of the present invention. In addition, a person of ordinary skill in the art can make variations and modifications to the present invention in terms of specific implementation manners and application scopes according to the ideas of the present invention. Therefore, the content of specification shall not be construed as a limit to the present invention.

What is claimed is:

1. A method of displaying an application option for a terminal device having a touch screen, comprising:
   configuring, by the terminal device, a first plurality of application options based on user input, wherein at least two of the first plurality of application options are associated with a same application;
   collecting a first fingerprint information corresponding to a first finger at a fingerprint collecting area of the terminal device;
   determining that the collected first fingerprint information matches a first predetermined fingerprint information and that a duration of the first finger at the fingerprint collecting area exceeds a predetermined duration;
   in response to the determination that the collected first fingerprint information matches the first predetermined fingerprint information and that the duration of the first finger at the fingerprint collecting area exceeds the predetermined duration, displaying a first interface, and the first plurality of application options configured based on user input are displayed together on the first interface
   detecting a first sliding gesture corresponding to an application option of the first plurality of application options, wherein the first sliding gesture is started at a position where the first fingerprint information is collected at the fingerprint collecting area; and
   in response to detecting that the first sliding gesture corresponds to the application option of the first plurality of application options, displaying an interface corresponding to the application option of the first plurality of application options.

2. The method according to claim 1, wherein the fingerprint collecting area is determined based on a one-hand operation mode.

3. The method according to claim 1, wherein an identifier of the application option comprises an image, a nickname, a character, a character string or a number.

4. The method according to claim 1, wherein the fingerprint collecting area is located on the touch screen.

5. The method according to claim 4, wherein the touch screen remains black before the collection of the fingerprint information, and the fingerprint information is used for lighting up the touch screen.

6. The method according to claim 1, wherein the first interface in a form of a floating interface is displayed on a second interface, and icons of multiple installed applications are displayed on the second interface.

7. The method according to claim 1, further comprising:
   detecting a touch operation on a third an another application option of the displayed plurality of application options;
   displaying an interface corresponding to the another application option of the displayed plurality of application options.

8. The method according to claim 1, wherein the method further comprises:
   collecting a second fingerprint information at the fingerprint collecting area;
   determining that the collected second fingerprint information matches a second predetermined fingerprint information and that a duration of a second finger at the fingerprint collecting area exceeds the predetermined duration; and
   in response to the determination that the collected second fingerprint information matches the second predetermined fingerprint information and that the duration of the second finger at the fingerprint collecting area exceeds the predetermined duration, displaying a second interface, and a second plurality of application options are displayed together on the second interface, wherein the second plurality of application options are pre-configured based on user input;
   detecting a second sliding gesture corresponding to an another application option of the second plurality of application options, wherein the second sliding gesture is started at a position where the second fingerprint information is collected at the fingerprint collecting area; and
   in response to detecting that the second sliding gesture corresponds to the another application option of the second plurality of application options, in response to the second sliding gesture, displaying an interface corresponding to the another application option of the second plurality of application options.

9. The method according to claim 1, wherein the touch screen remains black before the collection of the fingerprint information, and the method further comprises:
   detecting an operation on a physical button for lighting up the touch screen.

10. A terminal device, comprising:
    a touch screen;
    a memory;
    one or more processors;
    one or more programs, wherein the one or more programs are stored in the memory and configured to be executed by the one or more processors, the one or more programs including instructions for:
    configuring, by the terminal device, a first plurality of application options based on user input, wherein at least two of the first plurality of application options are associated with a same application;
    collecting a first fingerprint information corresponding to a first finger at a fingerprint collecting area of the terminal device;

determining that the collected first fingerprint information matches a first predetermined fingerprint information and that a duration of the first finger at the fingerprint collecting area exceeds a predetermined duration;

in response to the determination that the collected first fingerprint information matches the first predetermined fingerprint information and that the duration of the first finger at the fingerprint collecting area exceeds the predetermined duration, displaying a first interface, and the first plurality of application options configured based on user input are displayed together on the first interface detecting a first sliding gesture corresponding to an application option of the first plurality of application options, wherein the first sliding gesture is started at a position where the first fingerprint information is collected at the fingerprint collecting area; and in response to detecting that the first sliding gesture corresponds to the application option of the first plurality of application options, displaying an interface corresponding to the application option of the first plurality of application options.

11. The terminal device according to claim 10, wherein the fingerprint collecting area is determined based on a one-hand operation mode.

12. The terminal device according to claim 10, wherein an identifier of the application option comprises an image, a nickname, a character, a character string or a number.

13. The terminal device according to claim 10, wherein the fingerprint collecting area is located on the touch screen.

14. The terminal device according to claim 13, wherein the touch screen remains black before the collection of the fingerprint information, and the fingerprint information is used for lighting up the touch screen.

15. The terminal device according to claim 10, wherein the first interface in a form of a floating interface is displayed on a second interface, and icons of multiple installed applications are displayed on the second interface.

16. The terminal device according to claim 10, wherein the one or more programs further including instructions for:
   detecting a touch operation on an another application option of the displayed plurality of application options;
   displaying an interface corresponding to the another application option of the displayed plurality of application options.

17. The terminal device according to claim 10, wherein the one or more programs including instructions for:
   collecting a second fingerprint information at the fingerprint collecting area;
   determining that the collected second fingerprint information matches a second predetermined fingerprint information and that a duration of a second finger at the fingerprint collecting area exceeds the predetermined duration; and
   in response to the determination that the collected second fingerprint information matches the second predetermined fingerprint information and that the duration of the second finger at the fingerprint collecting area exceeds the predetermined duration, displaying a second interface, and a second plurality of application options are displayed together on the second interface, wherein the second plurality of application options are pre-configured based on user input;
   detecting a second sliding gesture corresponding to an another application option of the second plurality of application options, wherein the second sliding gesture is started at a position where the second fingerprint information is collected at the fingerprint collecting area; and
   in response to detecting that the second sliding gesture corresponds to the another application option of the second plurality of application options, in response to the second sliding gesture, displaying an interface corresponding to the another application option of the second plurality of application options.

18. The terminal device according to claim 10, wherein the touch screen remains black before the collection of the fingerprint information, and the one or more programs including instructions for:
   detecting an operation on a physical button for lighting up the touch screen.

19. A terminal device, comprising:
   a memory;
   one or more processors;
   one or more programs, wherein the one or more programs are stored in the memory and configured to be executed by the one or more processors, the one or more programs including instructions for:
   configuring, by the terminal device, a first plurality of application options based on user input, wherein at least two of the first plurality of application options are associated with a same application;
   collecting a fingerprint information corresponding to a finger at a fingerprint collecting area of the terminal device when a touch screen of the terminal device remains black;
   performing fingerprint recognition based on the collected fingerprint information;
   in response to success of the fingerprint recognition, lighting up the touch screen and displaying a first interface, and the first plurality of application options configured based on user input are displayed together on the first interface;
   detecting a slide gesture started at a position where the fingerprint information is collected on the fingerprint collecting area, wherein the slide gesture corresponds to a first application option of the first plurality of application options; and
   in response to detecting the slide gesture, executing the first application option.

20. The terminal device according to claim 19, wherein the first interface in a form of a floating interface is displayed on a second interface, and icons of multiple installed applications are displayed on the second interface.

* * * * *

UNITED STATES PATENT AND TRADEMARK OFFICE
CERTIFICATE OF CORRECTION

PATENT NO. : 10,908,776 B2
APPLICATION NO. : 15/764182
DATED : February 2, 2021
INVENTOR(S) : Jianjun Chen, Fredrik Rusek and Hongjun Wang It is certified that error appears in the above-identified patent and that said Letters Patent is hereby corrected as shown below:

In the Claims

In Column 42, Line 12, in Claim 7, delete "a third an" and insert -- an --, therefor.

Signed and Sealed this
Twenty-seventh Day of April, 2021

Drew Hirshfeld
*Performing the Functions and Duties of the*
*Under Secretary of Commerce for Intellectual Property and*
*Director of the United States Patent and Trademark Office*